US011817076B2

(12) United States Patent
Sereshki et al.

(10) Patent No.: US 11,817,076 B2
(45) Date of Patent: *Nov. 14, 2023

(54) MULTI-CHANNEL ACOUSTIC ECHO CANCELLATION

(71) Applicant: Sonos, Inc., Santa Barbara, CA (US)

(72) Inventors: Saeed Bagheri Sereshki, Goleta, CA (US); Romi Kadri, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,501

(22) Filed: Dec. 22, 2022

(65) Prior Publication Data
US 2023/0127040 A1   Apr. 27, 2023

Related U.S. Application Data

(63) Continuation of application No. 17/145,667, filed on Jan. 11, 2021, now Pat. No. 11,538,451, which is a
(Continued)

(51) Int. Cl.
*G10K 11/178* (2006.01)
*H04B 17/336* (2015.01)
(Continued)

(52) U.S. Cl.
CPC ............ *G10K 11/178* (2013.01); *G06F 3/165* (2013.01); *G10L 21/0208* (2013.01);
(Continued)

(58) Field of Classification Search
CPC ............ G10K 11/178; G10K 2210/505; G10L 21/0208; H04M 9/082; H04R 27/00; H04R 2227/005
See application file for complete search history.

(56) References Cited

U.S. PATENT DOCUMENTS

| 999,715 A | 8/1911 | Gundersen |
| 5,717,768 A | 2/1998 | Laroche |

(Continued)

FOREIGN PATENT DOCUMENTS

| CN | 1748250 A | 3/2006 |
| CN | 1781291 A | 5/2006 |

(Continued)

OTHER PUBLICATIONS

Non-Final Office Action dated Dec. 15, 2022, issued in connection with U.S. Appl. No. 17/549,253, filed Dec. 13, 2021, 10 pages.
(Continued)

*Primary Examiner* — David L Ton

(57) ABSTRACT

A playback device is configured to: produce a first channel audio output of a first channel of audio content; produce a second channel audio output of a second channel of the audio content; receive captured audio content comprising (i) a first portion corresponding to the first channel audio output, (ii) a second portion corresponding to the second channel audio output, and (iii) a third portion corresponding to a voice command, wherein the captured audio content has a first signal-to-noise ratio; determine a set of signal components from at least one of the first channel or the second channel of the audio content; perform acoustic echo cancellation on a subset of signal components; determine an acoustic echo cancellation output; and apply the acoustic echo cancellation output to the captured audio content and thereby increase the first signal-to-noise ratio to a second signal-to-noise ratio that is greater than the first signal-to-noise ratio.

20 Claims, 11 Drawing Sheets

Related U.S. Application Data continuation of application No. 16/598,125, filed on Oct. 10, 2019, now Pat. No. 10,891,932, which is a continuation of application No. 15/718,911, filed on Sep. 28, 2017, now Pat. No. 10,482,868.

(51) Int. Cl.
   *H04R 27/00* (2006.01)
   *G06F 3/16* (2006.01)
   *H04M 9/08* (2006.01)
   *G10L 21/0208* (2013.01)
   *H04L 65/75* (2022.01)

(52) U.S. Cl.
   CPC .......... *H04B 17/336* (2015.01); *H04L 65/75* (2022.05); *H04M 9/082* (2013.01); *H04R 27/00* (2013.01); *G10K 2210/3012* (2013.01); *G10K 2210/505* (2013.01); *G10L 2021/02082* (2013.01); *H04R 2227/005* (2013.01)

(56) References Cited

U.S. PATENT DOCUMENTS

| | | |
|---|---|---|
| 5,857,172 A | 1/1999 | Rozak |
| 6,070,140 A | 5/2000 | Tran |
| 6,219,645 B1 | 4/2001 | Byers |
| 7,516,068 B1 | 4/2009 | Clark |
| 7,705,565 B2 | 4/2010 | Patino et al. |
| 8,085,947 B2 | 12/2011 | Haulick et al. |
| 8,325,909 B2 | 12/2012 | Tashev et al. |
| 8,594,320 B2 | 11/2013 | Faller |
| 8,620,232 B2 | 12/2013 | Helsloot |
| 8,639,214 B1 | 1/2014 | Fujisaki |
| 8,762,156 B2 | 6/2014 | Chen |
| 8,898,063 B1 | 11/2014 | Sykes et al. |
| 9,002,024 B2 | 4/2015 | Nakadai et al. |
| 9,047,857 B1 | 6/2015 | Barton |
| 9,070,367 B1 | 6/2015 | Hoffmeister et al. |
| 9,088,336 B2 | 7/2015 | Mani et al. |
| 9,183,845 B1 | 11/2015 | Gopalakrishnan et al. |
| 9,313,317 B1 | 4/2016 | Lebeau et al. |
| 9,354,687 B2 | 5/2016 | Bansal et al. |
| 9,491,033 B1 | 11/2016 | Soyannwo et al. |
| 9,514,747 B1 | 12/2016 | Bisani et al. |
| 9,542,941 B1 | 1/2017 | Weksler et al. |
| 9,558,755 B1 | 1/2017 | Laroche et al. |
| 9,640,194 B1 | 5/2017 | Nemala et al. |
| 9,672,812 B1 | 6/2017 | Watanabe et al. |
| 9,691,384 B1 | 6/2017 | Wang et al. |
| 9,749,738 B1 | 8/2017 | Adsumilli et al. |
| 9,781,532 B2 | 10/2017 | Sheen |
| 9,799,330 B2 | 10/2017 | Nemala et al. |
| 9,812,128 B2 | 11/2017 | Mixter et al. |
| 9,898,250 B1 | 2/2018 | Williams et al. |
| 9,899,021 B1 | 2/2018 | Vitaladevuni et al. |
| 10,028,069 B1 | 7/2018 | Lang |
| 10,038,419 B1 | 7/2018 | Elliot et al. |
| 10,134,398 B2 | 11/2018 | Sharifi |
| 10,186,276 B2 | 1/2019 | Dewasurendra et al. |
| 10,249,205 B2 | 4/2019 | Hammersley et al. |
| 10,304,440 B1 | 5/2019 | Panchapagesan et al. |
| 10,304,475 B1 | 5/2019 | Wang et al. |
| 10,332,508 B1 | 6/2019 | Hoffmeister |
| 10,424,296 B2 | 9/2019 | Penilla et al. |
| 10,586,534 B1 | 3/2020 | Argyropoulos et al. |
| 10,593,328 B1 | 3/2020 | Wang et al. |
| 10,593,330 B2 | 3/2020 | Sharifi |
| 10,699,711 B2 | 6/2020 | Reilly |
| 10,824,682 B2 | 11/2020 | Alvares et al. |
| 10,825,471 B2 | 11/2020 | Walley et al. |
| 10,837,667 B2 | 11/2020 | Nelson et al. |
| 10,847,137 B1 | 11/2020 | Mandal et al. |
| 10,867,604 B2 | 12/2020 | Smith et al. |
| 10,871,943 B1 | 12/2020 | D'Amato et al. |
| 10,878,811 B2 | 12/2020 | Smith et al. |
| 10,964,314 B2 | 3/2021 | Jazi et al. |
| 11,024,311 B2 | 6/2021 | Mixter et al. |
| 11,050,615 B2 | 6/2021 | Mathews et al. |
| 11,062,705 B2 | 7/2021 | Watanabe et al. |
| 11,100,923 B2 | 8/2021 | Fainberg et al. |
| 11,137,979 B2 | 10/2021 | Plagge |
| 11,138,969 B2 | 10/2021 | D'Amato |
| 11,159,878 B1 | 10/2021 | Chatlani et al. |
| 11,172,328 B2 | 11/2021 | Soto et al. |
| 11,172,329 B2 | 11/2021 | Soto et al. |
| 11,175,880 B2 | 11/2021 | Liu et al. |
| 11,184,704 B2 | 11/2021 | Jarvis et al. |
| 11,206,052 B1 | 12/2021 | Park et al. |
| 11,264,019 B2 | 3/2022 | Bhattacharya et al. |
| 11,277,512 B1 | 3/2022 | Leeds et al. |
| 11,315,556 B2 | 4/2022 | Smith et al. |
| 11,354,092 B2 | 6/2022 | D'Amato et al. |
| 11,361,763 B1 | 6/2022 | Maas et al. |
| 11,373,645 B1 | 6/2022 | Mathew et al. |
| 11,411,763 B2 | 8/2022 | MacKay et al. |
| 1,445,301 A1 | 9/2022 | Park et al. |
| 11,514,898 B2 | 11/2022 | Millington |
| 2002/0054685 A1 | 5/2002 | Avendano et al. |
| 2002/0055950 A1 | 5/2002 | Witteman |
| 2002/0143532 A1 | 10/2002 | McLean et al. |
| 2004/0153321 A1 | 8/2004 | Chung et al. |
| 2004/0161082 A1 | 8/2004 | Brown et al. |
| 2007/0038461 A1 | 2/2007 | Abbott et al. |
| 2008/0008333 A1 | 1/2008 | Nishikawa et al. |
| 2008/0031466 A1 | 2/2008 | Buck et al. |
| 2008/0160977 A1 | 7/2008 | Ahmaniemi et al. |
| 2008/0192946 A1 | 8/2008 | Faller |
| 2008/0291916 A1 | 11/2008 | Xiong et al. |
| 2009/0013255 A1 | 1/2009 | Yuschik et al. |
| 2009/0046866 A1 | 2/2009 | Feng et al. |
| 2009/0113053 A1 | 4/2009 | Van Wie et al. |
| 2009/0214048 A1 | 8/2009 | Stokes, III et al. |
| 2009/0299745 A1 | 12/2009 | Kennewick et al. |
| 2009/0323924 A1 | 12/2009 | Tashev et al. |
| 2010/0070276 A1 | 3/2010 | Wasserblat et al. |
| 2010/0260348 A1 | 10/2010 | Bhow et al. |
| 2010/0278351 A1 | 11/2010 | Fozunbal et al. |
| 2010/0299639 A1 | 11/2010 | Ramsay et al. |
| 2010/0329472 A1 | 12/2010 | Nakadai et al. |
| 2010/0332236 A1 | 12/2010 | Tan |
| 2011/0019833 A1 | 1/2011 | Kuech et al. |
| 2011/0176687 A1 | 7/2011 | Birkenes |
| 2012/0009906 A1 | 1/2012 | Patterson et al. |
| 2012/0020485 A1 | 1/2012 | Visser et al. |
| 2012/0027218 A1 | 2/2012 | Every et al. |
| 2012/0076308 A1 | 3/2012 | Kuech et al. |
| 2012/0224457 A1 | 9/2012 | Kim et al. |
| 2012/0237047 A1 | 9/2012 | Neal et al. |
| 2012/0265528 A1 | 10/2012 | Gruber et al. |
| 2012/0288100 A1 | 11/2012 | Cho |
| 2013/0073293 A1 | 3/2013 | Jang et al. |
| 2013/0080167 A1 | 3/2013 | Mozer |
| 2013/0080171 A1 | 3/2013 | Mozer et al. |
| 2013/0129100 A1 | 5/2013 | Sorensen |
| 2013/0185639 A1 | 7/2013 | Lim |
| 2013/0230184 A1 | 9/2013 | Kuech et al. |
| 2013/0238326 A1 | 9/2013 | Kim et al. |
| 2013/0283169 A1 | 10/2013 | Van Wie |
| 2013/0289994 A1 | 10/2013 | Newman et al. |
| 2013/0294611 A1 | 11/2013 | Yoo et al. |
| 2013/0301840 A1 | 11/2013 | Yemdji et al. |
| 2013/0322634 A1 | 12/2013 | Bennett et al. |
| 2013/0336499 A1 | 12/2013 | Beckhardt et al. |
| 2014/0056435 A1 | 2/2014 | Kjems et al. |
| 2014/0064476 A1 | 3/2014 | Mani et al. |
| 2014/0108010 A1 | 4/2014 | Maltseff et al. |
| 2014/0126745 A1 | 5/2014 | Dickins et al. |
| 2014/0159581 A1 | 6/2014 | Pruemmer et al. |
| 2014/0161263 A1 | 6/2014 | Koishida et al. |
| 2014/0181199 A1 | 6/2014 | Kumar et al. |
| 2014/0188476 A1 | 7/2014 | Li et al. |
| 2014/0200881 A1 | 7/2014 | Chatlani |
| 2014/0229959 A1 | 8/2014 | Beckhardt et al. |

(56) References Cited

U.S. PATENT DOCUMENTS

| | | |
|---|---|---|
| 2014/0244269 A1 | 8/2014 | Tokutake |
| 2014/0270216 A1 | 9/2014 | Tsilfidis et al. |
| 2014/0278343 A1 | 9/2014 | Tran |
| 2014/0278445 A1 | 9/2014 | Eddington, Jr. |
| 2014/0288686 A1 | 9/2014 | Sant et al. |
| 2014/0328490 A1 | 11/2014 | Mohammad et al. |
| 2014/0364089 A1 | 12/2014 | Lienhart et al. |
| 2014/0365225 A1 | 12/2014 | Haiut |
| 2014/0368734 A1 | 12/2014 | Hoffert et al. |
| 2015/0030172 A1 | 1/2015 | Gaensler et al. |
| 2015/0032443 A1 | 1/2015 | Karov et al. |
| 2015/0032456 A1 | 1/2015 | Wait |
| 2015/0039310 A1 | 2/2015 | Clark et al. |
| 2015/0039311 A1 | 2/2015 | Clark et al. |
| 2015/0073807 A1 | 3/2015 | Kumar |
| 2015/0088500 A1 | 3/2015 | Conliffe |
| 2015/0126255 A1 | 5/2015 | Yang et al. |
| 2015/0154953 A1 | 6/2015 | Bapat et al. |
| 2015/0221307 A1 | 8/2015 | Shah et al. |
| 2015/0373100 A1 | 12/2015 | Kravets et al. |
| 2015/0382128 A1 | 12/2015 | Ridihalgh et al. |
| 2016/0027440 A1 | 1/2016 | Gelfenbeyn et al. |
| 2016/0034448 A1 | 2/2016 | Tran |
| 2016/0055847 A1 | 2/2016 | Dahan |
| 2016/0066087 A1 | 3/2016 | Solbach et al. |
| 2016/0077794 A1 | 3/2016 | Kim et al. |
| 2016/0093281 A1 | 3/2016 | Kuo et al. |
| 2016/0134924 A1 | 5/2016 | Bush et al. |
| 2016/0148612 A1 | 5/2016 | Guo et al. |
| 2016/0212488 A1 | 7/2016 | Os et al. |
| 2016/0299737 A1 | 10/2016 | Clayton et al. |
| 2016/0379635 A1 | 12/2016 | Page |
| 2017/0083606 A1 | 3/2017 | Mohan |
| 2017/0084278 A1 | 3/2017 | Jung |
| 2017/0110130 A1 | 4/2017 | Sharifi et al. |
| 2017/0140750 A1 | 5/2017 | Wang et al. |
| 2017/0140757 A1 | 5/2017 | Penilla et al. |
| 2017/0164139 A1 | 6/2017 | Deselaers et al. |
| 2017/0186425 A1 | 6/2017 | Dawes et al. |
| 2017/0186427 A1 | 6/2017 | Wang et al. |
| 2017/0269900 A1 | 9/2017 | Triplett |
| 2017/0300289 A1 | 10/2017 | Gattis |
| 2017/0329397 A1 | 11/2017 | Lin |
| 2017/0357390 A1 | 12/2017 | Alonso Ruiz et al. |
| 2017/0365247 A1 | 12/2017 | Ushakov |
| 2018/0012077 A1 | 1/2018 | Laska et al. |
| 2018/0033429 A1 | 2/2018 | Makke et al. |
| 2018/0061409 A1 | 3/2018 | Valentine et al. |
| 2018/0096678 A1 | 4/2018 | Zhou et al. |
| 2018/0137857 A1 | 5/2018 | Zhou et al. |
| 2018/0139512 A1 | 5/2018 | Moran et al. |
| 2018/0182410 A1 | 6/2018 | Kaskari et al. |
| 2018/0196776 A1 | 7/2018 | Hershko et al. |
| 2018/0199130 A1 | 7/2018 | Jaffe et al. |
| 2018/0270573 A1 | 9/2018 | Lang et al. |
| 2018/0301147 A1 | 10/2018 | Kim |
| 2018/0330727 A1 | 11/2018 | Tulli |
| 2018/0336892 A1 | 11/2018 | Kim et al. |
| 2018/0350356 A1 | 12/2018 | Garcia |
| 2018/0350379 A1 | 12/2018 | Wung et al. |
| 2018/0352014 A1 | 12/2018 | Alsina et al. |
| 2018/0352334 A1 | 12/2018 | Family et al. |
| 2018/0358019 A1 | 12/2018 | Mont-Reynaud |
| 2019/0035404 A1 | 1/2019 | Gabel et al. |
| 2019/0037173 A1 | 1/2019 | Lee |
| 2019/0066680 A1 | 2/2019 | Woo et al. |
| 2019/0066710 A1 | 2/2019 | Bryan et al. |
| 2019/0073999 A1 | 3/2019 | Prémont et al. |
| 2019/0122662 A1 | 4/2019 | Chang et al. |
| 2019/0156847 A1 | 5/2019 | Bryan et al. |
| 2019/0172467 A1 | 6/2019 | Kim et al. |
| 2019/0172476 A1 | 6/2019 | Wung et al. |
| 2019/0186937 A1 | 6/2019 | Sharifi et al. |
| 2019/0237089 A1 | 8/2019 | Shin |
| 2019/0251960 A1 | 8/2019 | Maker et al. |
| 2019/0281387 A1 | 9/2019 | Woo et al. |
| 2019/0287536 A1 | 9/2019 | Sharifi et al. |
| 2019/0311715 A1 | 10/2019 | Pfeffinger et al. |
| 2019/0311718 A1 | 10/2019 | Huber et al. |
| 2019/0311722 A1 | 10/2019 | Caldwell |
| 2019/0318729 A1 | 10/2019 | Chao et al. |
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0371324 A1 | 12/2019 | Powell et al. |
| 2019/0371342 A1 | 12/2019 | Tukka et al. |
| 2019/0392832 A1 | 12/2019 | Mitsui et al. |
| 2020/0043489 A1 | 2/2020 | Bradley et al. |
| 2020/0110571 A1 | 4/2020 | Liu et al. |
| 2020/0135194 A1 | 4/2020 | Jeong |
| 2020/0244650 A1 | 7/2020 | Burris et al. |
| 2020/0342869 A1 | 10/2020 | Lee et al. |
| 2020/0409926 A1 | 12/2020 | Srinivasan et al. |
| 2021/0118439 A1 | 4/2021 | Schillmoeller et al. |
| 2021/0295849 A1 | 9/2021 | Van Der Ven et al. |
| 2021/0358481 A1 | 11/2021 | D'Amato et al. |
| 2022/0036882 A1 | 2/2022 | Ahn et al. |
| 2022/0050585 A1 | 2/2022 | Fettes et al. |
| 2022/0083136 A1 | 3/2022 | DeLeeuw |
| 2022/0301561 A1 | 9/2022 | Robert Jose et al. |

FOREIGN PATENT DOCUMENTS

| | | |
|---|---|---|
| CN | 101427154 A | 5/2009 |
| CN | 102999161 A | 3/2013 |
| CN | 104572009 A | 4/2015 |
| CN | 104885406 A | 9/2015 |
| CN | 104885438 A | 9/2015 |
| CN | 105162886 A | 12/2015 |
| CN | 105284168 A | 1/2016 |
| CN | 105389099 A | 3/2016 |
| CN | 105427861 A | 3/2016 |
| CN | 105453179 A | 3/2016 |
| CN | 105472191 A | 4/2016 |
| CN | 105493179 A | 4/2016 |
| CN | 105632486 A | 6/2016 |
| CN | 106030699 A | 10/2016 |
| CN | 106796784 A | 5/2017 |
| CN | 106910500 A | 6/2017 |
| CN | 107122158 A | 9/2017 |
| CN | 107465974 A | 12/2017 |
| CN | 107644313 A | 1/2018 |
| CN | 107767863 A | 3/2018 |
| CN | 107832837 A | 3/2018 |
| CN | 107919116 A | 4/2018 |
| CN | 108198548 A | 6/2018 |
| GB | 2501367 A | 10/2013 |
| JP | 2004109361 A | 4/2004 |
| JP | 2004163590 A | 6/2004 |
| JP | 2007235875 A | 9/2007 |
| JP | 2008217444 A | 9/2008 |
| JP | 2014510481 A | 4/2014 |
| JP | 2016009193 A | 1/2016 |
| JP | 2019109510 A | 7/2019 |
| TW | 201629950 A | 8/2016 |
| WO | 2008096414 A1 | 8/2008 |
| WO | 2015133022 A1 | 9/2015 |
| WO | 2015195216 A1 | 12/2015 |
| WO | 2016003509 A1 | 1/2016 |
| WO | 2018140777 A1 | 8/2018 |

OTHER PUBLICATIONS

Non-Final Office Action dated Feb. 15, 2023, issued in connection with U.S. Appl. No. 17/453,632, filed Nov. 4, 2021, 12 pages.

Non-Final Office Action dated Sep. 15, 2022, issued in connection with U.S. Appl. No. 17/247,507, filed Dec. 14, 2020, 9 pages.

Non-Final Office Action dated Sep. 15, 2022, issued in connection with U.S. Appl. No. 17/327,911, filed May 24, 2021, 44 pages.

Non-Final Office Action dated Feb. 16, 2023, issued in connection with U.S. Appl. No. 17/305,920, filed Jul. 16, 2021, 12 pages.

(56) References Cited

OTHER PUBLICATIONS

Non-Final Office Action dated Oct. 18, 2022, issued in connection with U.S. Appl. No. 16/949,973, filed Nov. 23, 2020, 31 pages.
Non-Final Office Action dated Sep. 19, 2022, issued in connection with U.S. Appl. No. 17/385,542, filed Jul. 26, 2021, 9 pages.
Non-Final Office Action dated Apr. 20, 2023, issued in connection with U.S. Appl. No. 18/061,570, filed Dec. 5, 2022, 12 pages.
Non-Final Office Action dated Oct. 20, 2022, issued in connection with U.S. Appl. No. 17/532,674, filed Nov. 22, 2021, 52 pages.
Non-Final Office Action dated Dec. 22, 2022, issued in connection with U.S. Appl. No. 16/168,389, filed Oct. 23, 2018, 39 pages.
Non-Final Office Action dated Sep. 23, 2022, issued in connection with U.S. Appl. No. 16/153,530, filed Oct. 5, 2018, 25 pages.
Non-Final Office Action dated Apr. 24, 2023, issued in connection with U.S. Appl. No. 17/532,744, filed Nov. 22, 2021, 18 pages.
Non-Final Office Action dated Apr. 25, 2023, issued in connection with U.S. Appl. No. 17/536,572, filed Nov. 29, 2021, 8 pages.
Non-Final Office Action dated Apr. 25, 2023, issued in connection with U.S. Appl. No. 17/656,794, filed Mar. 28, 2022, 22 pages.
Non-Final Office Action dated May 25, 2023, issued in connection with U.S. Appl. No. 18/157,937, filed Jan. 23, 2023, 9 pages.
Non-Final Office Action dated Oct. 25, 2022, issued in connection with U.S. Appl. No. 17/549,034, filed Dec. 13, 2021, 20 pages.
Non-Final Office Action dated Feb. 27, 2023, issued in connection with U.S. Appl. No. 17/493,430, filed Oct. 4, 2021, 17 pages.
Non-Final Office Action dated Feb. 28, 2023, issued in connection with U.S. Appl. No. 17/548,921, filed Dec. 13, 2021, 12 pages.
Non-Final Office Action dated Sep. 30, 2022, issued in connection with U.S. Appl. No. 17/353,254, filed Jun. 21, 2021, 22 pages.
Non-Final Office Action dated Nov. 4, 2022, issued in connection with U.S. Appl. No. 17/445,272, filed Aug. 17, 2021, 22 pages.
Non-Final Office Action dated Oct. 4, 2022, issued in connection with U.S. Appl. No. 16/915,234, filed Jun. 29, 2020, 16 pages.
Non-Final Office Action dated Apr. 5, 2023, issued in connection with U.S. Appl. No. 18/145,501, filed Dec. 22, 2022, 6 pages.
Non-Final Office Action dated Feb. 7, 2023, issued in connection with U.S. Appl. No. 17/303,001, filed May 18, 2021, 8 pages.
Non-Final Office Action dated Jun. 7, 2023, issued in connection with U.S. Appl. No. 16/179,779, filed Nov. 2, 2018, 29 pages.
Non-Final Office Action dated Jun. 8, 2023, issued in connection with U.S. Appl. No. 18/048,034, filed Oct. 20, 2022, 8 pages.
Non-Final Office Action dated Jun. 8, 2023, issued in connection with U.S. Appl. No. 18/061,243, filed Dec. 2, 2022, 10 pages.
Notice of Allowance dated Nov. 2, 2022, issued in connection with U.S. Appl. No. 16/989,805, filed Aug. 10, 2020, 5 pages.
Notice of Allowance dated Nov. 3, 2022, issued in connection with U.S. Appl. No. 17/448,015, filed Sep. 17, 2021, 7 pages.
Notice of Allowance dated Feb. 6, 2023, issued in connection with U.S. Appl. No. 17/077,974, filed Oct. 22, 2020, 7 pages.
Notice of Allowance dated Jan. 6, 2023, issued in connection with U.S. Appl. No. 17/896,129, filed Aug. 26, 2022, 13 pages.
Notice of Allowance dated Dec. 7, 2022, issued in connection with U.S. Appl. No. 17/315,599, filed May 10, 2021, 11 pages.
Notice of Allowance dated Feb. 8, 2023, issued in connection with U.S. Appl. No. 17/446,690, filed Sep. 1, 2021, 8 pages.
Notice of Allowance dated Jan. 9, 2023, issued in connection with U.S. Appl. No. 17/247,507, filed Dec. 14, 2020, 8 pages.
Notice of Allowance dated Jun. 9, 2023, issued in connection with U.S. Appl. No. 17/532,674, filed Nov. 22, 2021, 13 pages.
Notice of Allowance dated Mar. 9, 2023, issued in connection with U.S. Appl. No. 17/662,302, filed May 6, 2022, 7 pages.
Notice of Allowance dated Nov. 9, 2022, issued in connection with U.S. Appl. No. 17/385,542, filed Jul. 26, 2021, 8 pages.
Notice of Allowance dated May 11, 2022, issued in connection with U.S. Appl. No. 17/145,667, filed Jan. 11, 2021, 7 pages.
Notice of Allowance dated May 11, 2023, issued in connection with U.S. Appl. No. 18/061,638, filed Dec. 5, 2022, 15 pages.
Notice of Allowance dated Jun. 12, 2023, issued in connection with U.S. Appl. No. 17/453,632, filed Nov. 4, 2021, 9 pages.
Notice of Allowance dated Feb. 13, 2023, issued in connection with U.S. Appl. No. 18/045,360, filed Oct. 10, 2022, 9 pages.
Notice of Allowance dated Jun. 13, 2023, issued in connection with U.S. Appl. No. 17/249,776, filed Mar. 12, 2021, 10 pages.
Notice of Allowance dated Aug. 15, 2022, issued in connection with U.S. Appl. No. 17/101,949, filed Nov. 23, 2020, 11 pages.
Notice of Allowance dated Feb. 15, 2023, issued in connection with U.S. Appl. No. 17/659,613, filed Apr. 18, 2022, 21 pages.
Notice of Allowance dated Jun. 15, 2023, issued in connection with U.S. Appl. No. 17/305,698, filed Jul. 13, 2021, 8 pages.
Notice of Allowance dated Jun. 15, 2023, issued in connection with U.S. Appl. No. 17/305,920, filed Jul. 16, 2021, 8 pages.
Notice of Allowance dated Sep. 15, 2022, issued in connection with U.S. Appl. No. 16/736,725, filed Jan. 1, 2020, 11 pages.
Notice of Allowance dated Aug. 17, 2022, issued in connection with U.S. Appl. No. 17/135,347, filed Dec. 28, 2020, 14 pages.
Notice of Allowance dated Nov. 17, 2022, issued in connection with U.S. Appl. No. 17/486,222, filed Sep. 27, 2021, 10 pages.
Advisory Action dated Nov. 7, 2022, issued in connection with U.S. Appl. No. 16/168,389, filed Oct. 23, 2018, 4 pages.
Australian Patent Office, Australian Examination Report Action dated Nov. 10, 2022, issued in connection with Australian Application No. 2018312989, 2 pages.
Australian Patent Office, Australian Examination Report Action dated Sep. 28, 2022, issued in connection with Australian Application No. 2018338812, 3 pages.
Canadian Patent Office, Canadian Examination Report dated Sep. 14, 2022, issued in connection with Canadian Application No. 3067776, 4 pages.
Canadian Patent Office, Canadian Examination Report dated Oct. 19, 2022, issued in connection with Canadian Application No. 3123601, 5 pages.
Chinese Patent Office, First Office Action and Translation dated Feb. 9, 2023, issued in connection with Chinese Application No. 201880076788.0, 13 pages.
Chinese Patent Office, First Office Action and Translation dated Oct. 9, 2022, issued in connection with Chinese Application No. 201780056695.7, 10 pages.
Chinese Patent Office, First Office Action and Translation dated Nov. 10, 2022, issued in connection with Chinese Application No. 201980070006.7, 15 pages.
Chinese Patent Office, First Office Action and Translation dated Jan. 19, 2023, issued in connection with Chinese Application No. 201880064916.X, 10 pages.
Chinese Patent Office, First Office Action and Translation dated Sep. 19, 2022, issued in connection with Chinese Application No. 201980056604.9, 13 pages.
Chinese Patent Office, First Office Action and Translation dated Nov. 25, 2022, issued in connection with Chinese Application No. 201780056321.5, 8 pages.
Chinese Patent Office, First Office Action and Translation dated Feb. 27, 2023, issued in connection with Chinese Application No. 201980003798.6, 12 pages.
Chinese Patent Office, First Office Action and Translation dated Dec. 30, 2022, issued in connection with Chinese Application No. 201880076775.3, 10 pages.
Chinese Patent Office, Second Office Action and Translation dated Apr. 1, 2023, issued in connection with Chinese Application No. 201980056604.9, 11 pages.
Chinese Patent Office, Second Office Action dated Dec. 21, 2022, issued in connection with Chinese Application No. 201980089721.5, 12 pages.
Chinese Patent Office, Second Office Action dated May 30, 2023, issued in connection with Chinese Application No. 201980070006.7, 9 pages.
European Patent Office, European EPC Article 94.3 dated Jun. 5, 2023, issued in connection with European Application No. 20710649.3, 8 pages.
European Patent Office, European EPC Article 94.3 dated Feb. 10, 2023, issued in connection with European Application No. 19729968.8, 7 pages.

(56) References Cited

OTHER PUBLICATIONS

European Patent Office, European EPC Article 94.3 dated Feb. 23, 2023, issued in connection with European Application No. 19839734. 1, 8 pages.
European Patent Office, European EPC Article 94.3 dated Nov. 28, 2022, issued in connection with European Application No. 18789515. 6, 7 pages.
European Patent Office, European Extended Search Report dated Oct. 7, 2022, issued in connection with European Application No. 22182193.7, 8 pages.
European Patent Office, European Search Report dated Oct. 4, 2022, issued in connection with European Application No. 22180226.7, 6 pages.
Final Office Action dated Aug. 17, 2022, issued in connection with U.S. Appl. No. 16/179,779, filed Nov. 2, 2018, 26 pages.
Final Office Action dated May 17, 2023, issued in connection with U.S. Appl. No. 16/168,389, filed Oct. 23, 2018, 44 pages.
Final Office Action dated Aug. 22, 2022, issued in connection with U.S. Appl. No. 16/168,389, filed Oct. 23, 2018, 37 pages.
Final Office Action dated Mar. 29, 2023, issued in connection with U.S. Appl. No. 17/549,034, filed Dec. 13, 2021, 21 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en &as_sdt=0%2C14&q=SOURCE-DOMAIN+ADAPTIV E+FILTERING+FOR+MIMO+SYSTEMS+WITH+APPLICATIO N+TO+ACOUSTIC+ECHO+CANCELLATION&btnG=.
International Bureau, International Search Report and Written Opinion dated Mar. 20, 2023, issued in connection with International Application No. PCT/US2022/045399, filed on Sep. 30, 2022, 25 pages.
International Searching Authority, Invitation to Pay Additional Fees dated Jan. 27, 2023, issued in connection with International Application No. PCT/US2022/045399, filed on Sep. 30, 2022, 19 pages.
Japanese Patent Office, Decision of Refusal and Translation dated Oct. 4, 2022, issued in connection with Japanese Patent Application No. 2021-535871, 6 pages.
Japanese Patent Office, Decision of Refusal and Translation dated May 23, 2023, issued in connection with Japanese Patent Application No. 2021-163622, 13 pages.
Japanese Patent Office, Non-Final Office Action dated Apr. 4, 2023, issued in connection with Japanese Patent Application No. 2021-573944, 5 pages.
Japanese Patent Office, Notice of Reasons for Refusal and Translation dated Sep. 13, 2022, issued in connection with Japanese Patent Application No. 2021-163622, 12 pages.
Japanese Patent Office, Office Action and Translation dated Nov. 15, 2022, issued in connection with Japanese Patent Application No. 2021-146144, 9 pages.
Japanese Patent Office, Office Action dated Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Korean Patent Office, Korean Examination Report and Translation dated Apr. 10, 2023, issued in connection with Korean Application No. 10-2022-7024007, 8 pages.
Korean Patent Office, Korean Examination Report and Translation dated Oct. 13, 2022, issued in connection with Korean Application No. 10-2021-7030939, 4 pages.
Korean Patent Office, Korean Examination Report and Translation dated Mar. 31, 2023, issued in connection with Korean Application No. 10-2022-7016656, 7 pages.
Korean Patent Office, Korean Examination Report and Translation dated Oct. 31, 2021, issued in connection with Korean Application No. 10-2022-7024007, 10 pages.
Korean Patent Office, Office Action and Translation dated Feb. 27, 2023, issued in connection with Korean Application No. 10-2022-7021879, 5 pages.
Mathias Wolfel. Channel Selection by Class Separability Measures for Automatic Transcriptions on Distant Microphones, INTERSPEECH 2007 10.21437/Interspeech.2007-255, 4 pages.
Non-Final Office Action dated Feb. 2, 2023, issued in connection with U.S. Appl. No. 17/305,698, filed Jul. 13, 2021, 16 pages.
Non-Final Office Action dated Dec. 5, 2022, issued in connection with U.S. Appl. No. 17/662,302, filed May 6, 2022, 12 pages.
Non-Final Office Action dated Oct. 5, 2022, issued in connection with U.S. Appl. No. 17/449,926, filed Oct. 4, 2021, 11 pages.
Non-Final Office Action dated Feb. 11, 2022, issued in connection with U.S. Appl. No. 17/145,667, filed Jan. 11, 2021, 9 pages.
Non-Final Office Action dated Apr. 12, 2023, issued in connection with U.S. Appl. No. 17/878,649, filed Aug. 1, 2022, 16 pages.
Non-Final Office Action dated Nov. 14, 2022, issued in connection with U.S. Appl. No. 17/077,974, filed Oct. 22, 2020, 6 pages.
Non-Final Office Action dated Sep. 14, 2022, issued in connection with U.S. Appl. No. 17/446,690, filed Sep. 1, 2021, 10 pages.
Non-Final Office Action dated Aug. 15, 2022, issued in connection with U.S. Appl. No. 17/448,015, filed Sep. 17, 2021, 12 pages.
Notice of Allowance dated Dec. 20, 2022, issued in connection with U.S. Appl. No. 16/806,747, filed Mar. 2, 2020, 5 pages.
Notice of Allowance dated Jan. 20, 2023, issued in connection with U.S. Appl. No. 16/915,234, filed Jun. 29, 2020, 6 pages.
Notice of Allowance dated Mar. 20, 2023, issued in connection with U.S. Appl. No. 17/562,412, filed Dec. 27, 2021, 9 pages.
Notice of Allowance dated Mar. 21, 2023, issued in connection with U.S. Appl. No. 17/353,254, filed Jun. 21, 2021, 8 pages.
Notice of Allowance dated Nov. 21, 2022, issued in connection with U.S. Appl. No. 17/454,676, filed Nov. 12, 2021, 8 pages.
Notice of Allowance dated Sep. 21, 2022, issued in connection with U.S. Appl. No. 17/128,949, filed Dec. 21, 2020, 8 pages.
Notice of Allowance dated Sep. 22, 2022, issued in connection with U.S. Appl. No. 17/163,506, filed Jan. 31, 2021, 13 pages.
Notice of Allowance dated Sep. 22, 2022, issued in connection with U.S. Appl. No. 17/248,427, filed Jan. 25, 2021, 9 pages.
Notice of Allowance dated Feb. 23, 2023, issued in connection with U.S. Appl. No. 17/532,674, filed Nov. 22, 2021, 10 pages.
Notice of Allowance dated Apr. 26, 2022, issued in connection with U.S. Appl. No. 17/896,129, filed Aug. 26, 2022, 8 pages.
Notice of Allowance dated Apr. 26, 2023, issued in connection with U.S. Appl. No. 17/658,717, filed Apr. 11, 2022, 11 pages.
Notice of Allowance dated Aug. 26, 2022, issued in connection with U.S. Appl. No. 17/145,667, filed Jan. 11, 2021, 8 pages.
Notice of Allowance dated Oct. 26, 2022, issued in connection with U.S. Appl. No. 17/486,574, filed Sep. 27, 2021, 11 pages.
Notice of Allowance dated Sep. 28, 2022, issued in connection with U.S. Appl. No. 17/444,043, filed Jul. 29, 2021, 17 pages.
Notice of Allowance dated Dec. 29, 2022, issued in connection with U.S. Appl. No. 17/327,911, filed May 24, 2021, 14 pages.
Notice of Allowance dated Jul. 29, 2022, issued in connection with U.S. Appl. No. 17/236,559, filed Apr. 21, 2021, 6 pages.
Notice of Allowance dated Mar. 29, 2023, issued in connection with U.S. Appl. No. 17/722,438, filed Apr. 18, 2022, 7 pages.
Notice of Allowance dated Mar. 30, 2023, issued in connection with U.S. Appl. No. 17/303,066, filed May 19, 2021, 7 pages.
Notice of Allowance dated Mar. 31, 2023, issued in connection with U.S. Appl. No. 17/303,735, filed Jun. 7, 2021, 19 pages.
Notice of Allowance dated Apr. 5, 2023, issued in connection with U.S. Appl. No. 17/549,253, filed Dec. 13, 2021, 10 pages.
Notice of Allowance dated Mar. 6, 2023, issued in connection with U.S. Appl. No. 17/449,926, filed Oct. 4, 2021, 8 pages.
Simon Doclo et al. Combined Acoustic Echo and Noise Reduction Using GSVD-Based Optimal Filtering. In 2000 IEEE International Conference on Acoustics, Speech, and Signal Processing. Proceedings, Aug. 6, 2002, 4 pages. [retrieved on Feb. 23, 2023], Retrieved from the Internet: URL: https://scholar.google.com/scholar?hl=en &as_sdt=0%2C14&q=COMBINED+ACOUSTIC+ECH O+AND+NOISE+REDUCTION+USING+GSVD-BASED+ OPTIMAL+FILTERING&btnG=.

(56) References Cited

OTHER PUBLICATIONS

Wolf et al. On the potential of channel selection for recognition of reverberated speech with multiple microphones. Interspeech, TALP Research Center, Jan. 2010, 5 pages.

Wölfel et al. Multi-source far-distance microphone selection and combination for automatic transcription of lectures, Interspeech 2006—ICSLP, Jan. 2006, 5 pages.

Zhang et al. Noise Robust Speech Recognition Using Multi-Channel Based Channel Selection and Channel Weighting. The Institute of Electronics, Information and Communication Engineers, arXiv:1604.03276v1 [cs.SD] Jan. 1, 2010, 8 pages.

ated benefit of priority as a continuation under 35 U.S.C. § 120 to U.S. patent application Ser. No. 17/145,667, filed on Jan. 11, 2021, and entitled "Multi-Channel Acoustic Echo Cancellation," which is a continuation of U.S. patent application Ser. No. 16/598,125, filed on Oct. 10, 2019, issued as U.S. Pat. No. 10,891,932, and entitled "Multi-Channel Acoustic Echo Cancellation," which is a continuation of U.S. patent application Ser. No. 15/718,911, filed on Sep. 28, 2017, issued as U.S. Pat. No. 10,482,868, and entitled "Multi-Channel Acoustic Echo Cancellation," the contents of each of which are herein incorporated by reference in their entirety for all purposes.

MULTI-CHANNEL ACOUSTIC ECHO CANCELLATION

CROSS-REFERENCE TO RELATED APPLICATION

The present application claims the benefit of priority as a continuation under 35 U.S.C. § 120 to U.S. patent application Ser. No. 17/145,667, filed on Jan. 11, 2021, and entitled "Multi-Channel Acoustic Echo Cancellation," which is a continuation of U.S. patent application Ser. No. 16/598,125, filed on Oct. 10, 2019, issued as U.S. Pat. No. 10,891,932, and entitled "Multi-Channel Acoustic Echo Cancellation," which is a continuation of U.S. patent application Ser. No. 15/718,911, filed on Sep. 28, 2017, issued as U.S. Pat. No. 10,482,868, and entitled "Multi-Channel Acoustic Echo Cancellation," the contents of each of which are herein incorporated by reference in their entirety for all purposes.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
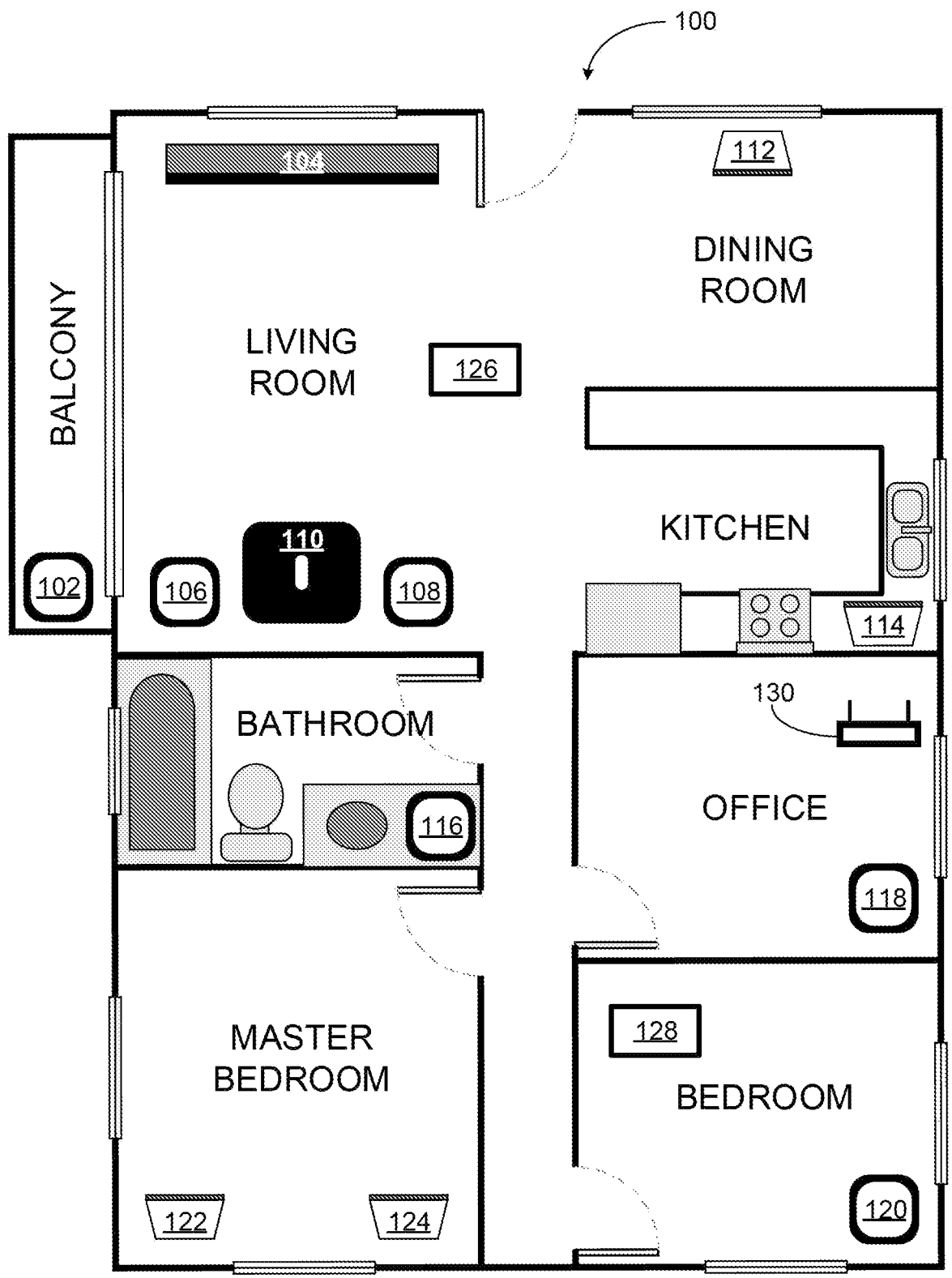
FIG. 1 shows a media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some playback devices configured to play back music and/or other audio content also have voice control capabilities. These playback devices may be configured to receive vocal commands from a user via a microphone, analyze the received vocal commands, and translate the vocal commands for execution by the playback device. For example, if a user speaks a vocal command to "play the Rolling Stones", the playback device may capture this command via the microphone, analyze and translate the command, and correspondingly play back music from the Rolling Stones.

However, in some instances, the user may issue vocal commands when the playback device is already playing back media, and the microphone may capture audio that corresponds to both the user's vocal commands and the media output by the playback device. In such circumstances, the media that is output by the playback device may comprise "noise" that can obscure the user's vocal command to the playback device. In other circumstances, the audio captured by the microphone of the media playback by the playback device may itself be interpreted as a voice command issued to the playback device, and the playback device may devote computational resources to determine the nature of this false "command" captured by the microphone.

Thus, performing acoustic echo cancellation on the captured signal may "filter out" the output of the media played back by the playback device, thereby increasing the signal-to-noise ratio of the signal captured by the microphone. Essentially, the acoustic echo cancellation process removes the unwanted audio played by the playback device from the audio signal captured by the microphone, thereby making the voice command on the captured audio more clear.

However, performing acoustic echo cancellation using a playback device having more than one speaker (e.g., a multi-channel playback system) may have associated disadvantages. Specifically, a stream of audio signals is typically sent to each of the two or more speaker drivers of the playback device, and each stream of audio signals must be individually filtered from the captured audio by acoustic echo cancellation. This filtering process typically requires a substantial amount of computational resources, which is often beyond the computational capabilities of a CPU of a typical playback device.

The examples provided herein involve methods, playback devices, and systems that allow multi-channel acoustic echo cancellation to be performed using less computational resources than the previously-described acoustic echo cancellation process. In some embodiments, multi-channel acoustic echo cancellation can be performed using existing CPUs of playback devices.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
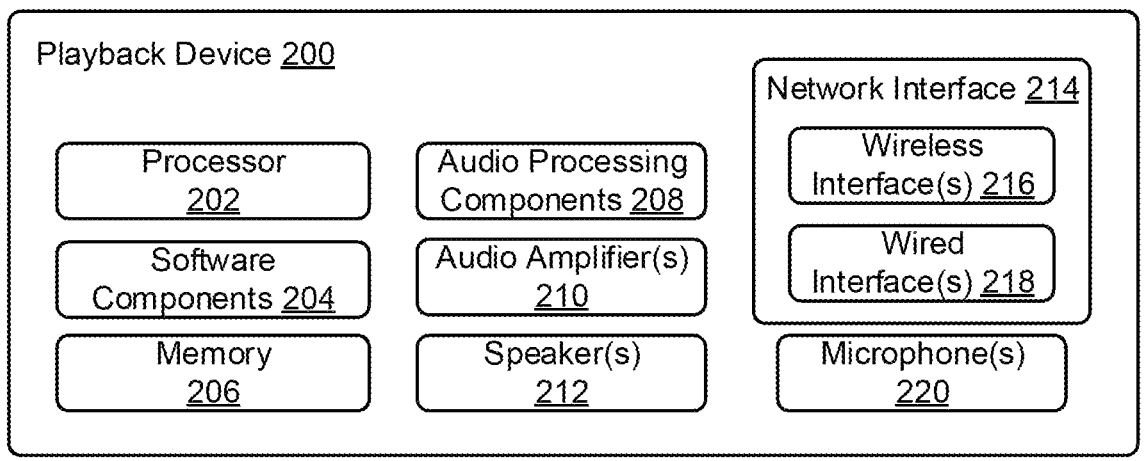
FIG. 2 is a functional block diagram of an example playback device according to aspects described herein.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is incorporated by reference herein in its entirety, provides detailed examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for very low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
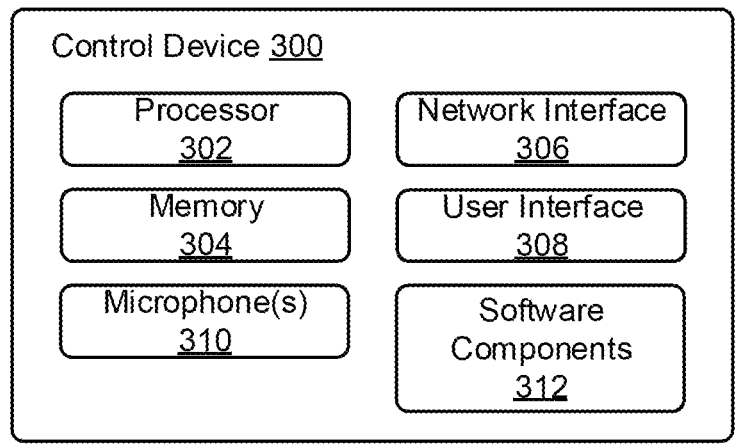
FIG. 3 is a functional block diagram of an example control device according to aspects described herein.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac').

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
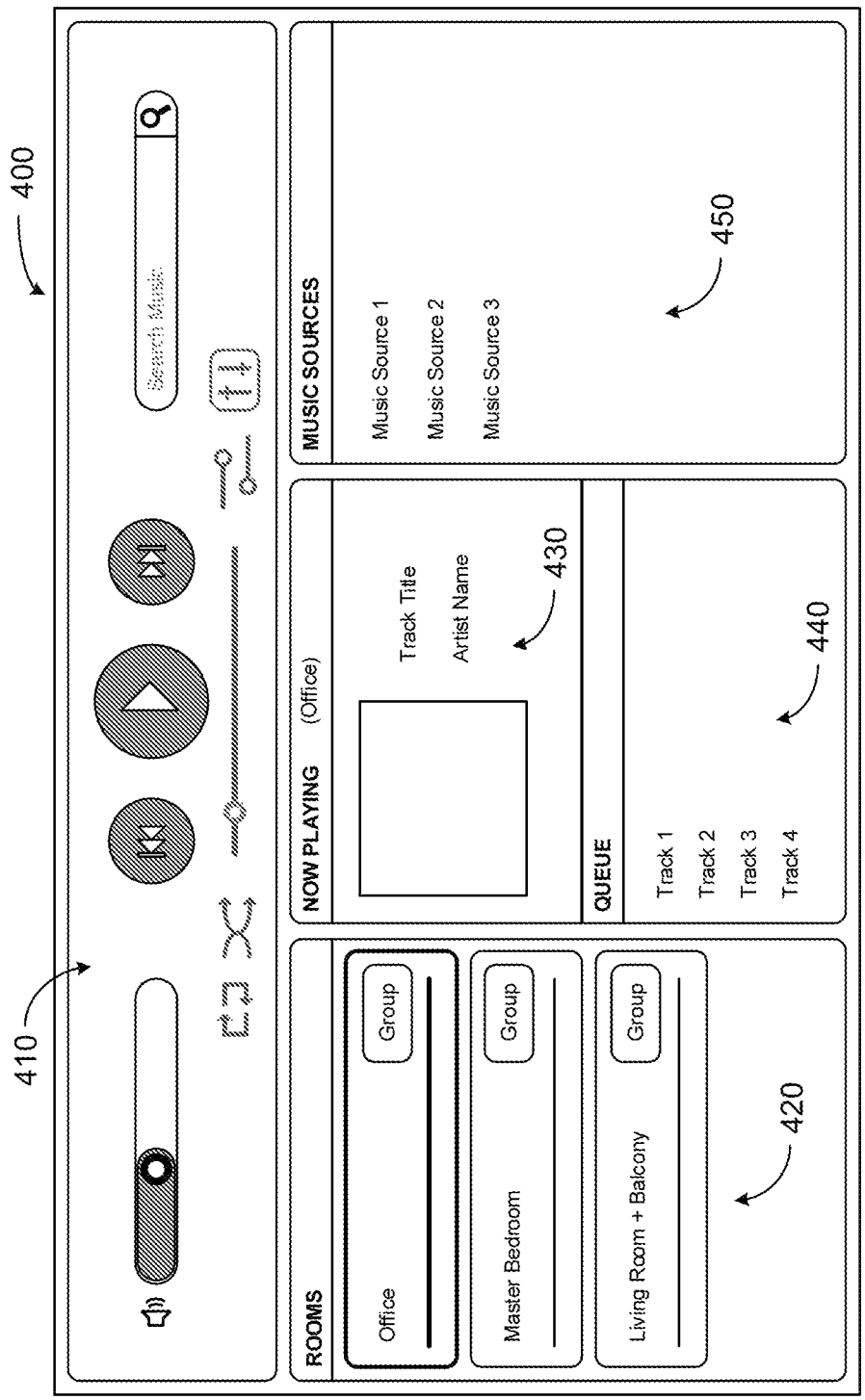
FIG. 4 is an example controller interface according to aspects described herein.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
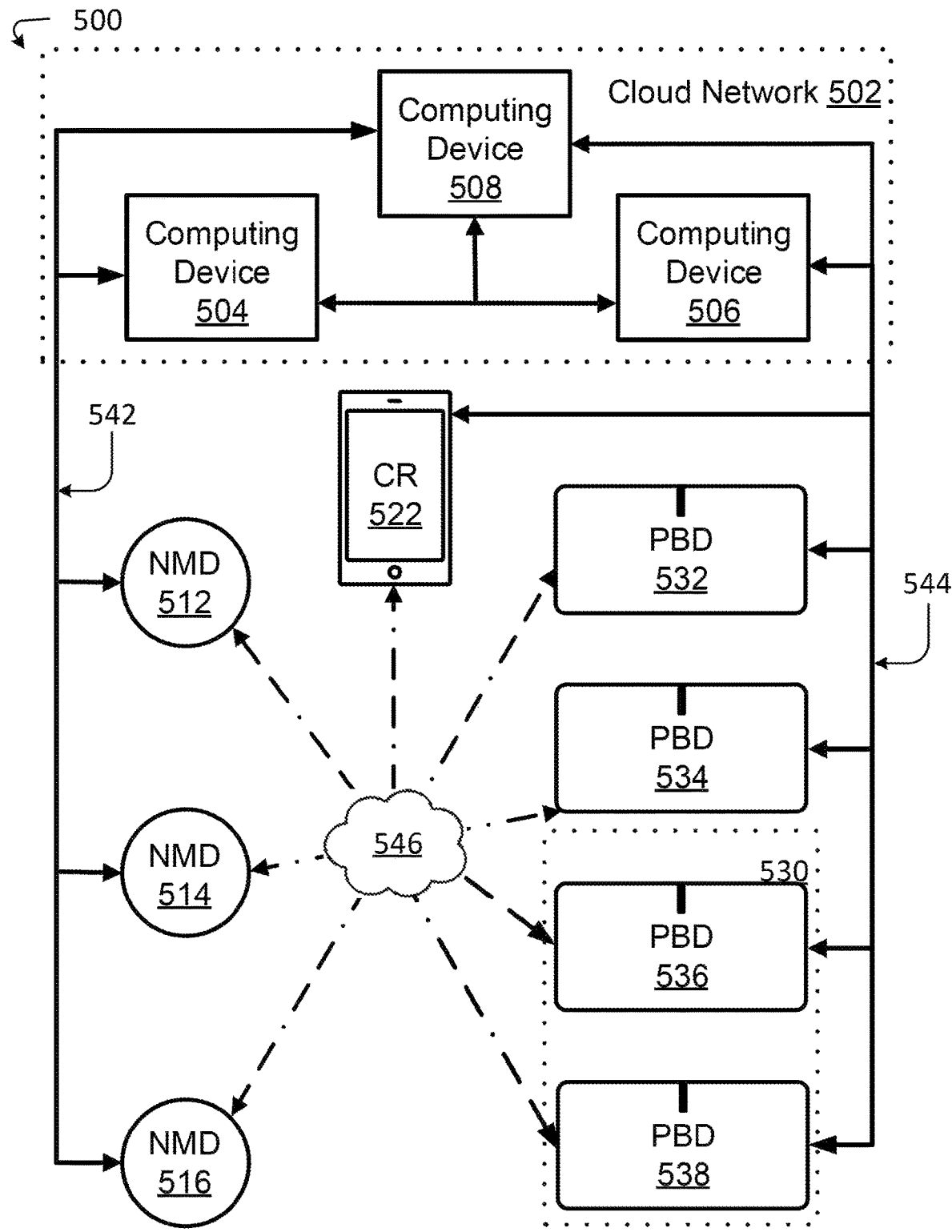
FIG. 5 is a schematic diagram of a plurality of network devices according to aspects described herein.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

In yet another example, the computing device 504 may perform some processing to identify the relevant command or intent of the user and provide information regarding media content relevant to the voice input to the computing device 506. For example, the computing device 504 may perform the speech-to-text conversion of the voice input and analyze the voice input for a command or intent (e.g., play, pause, stop, volume up, volume down, skip, next, group, ungroup) along with other information about how to execute the command. The computing device 504 or the computing device 506 may determine what PBD commands correspond to the command or intent determined by the computing device 504. The command or intent determined from the voice input and/or other information related to executing the command may be transmitted from the computing device 504 to the computing device 506. The processing on the computing device 504 may be performed by an application, a module, add-on software, an integration with the native networked microphone system software platform, and/or the native networked microphone system software platform.

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
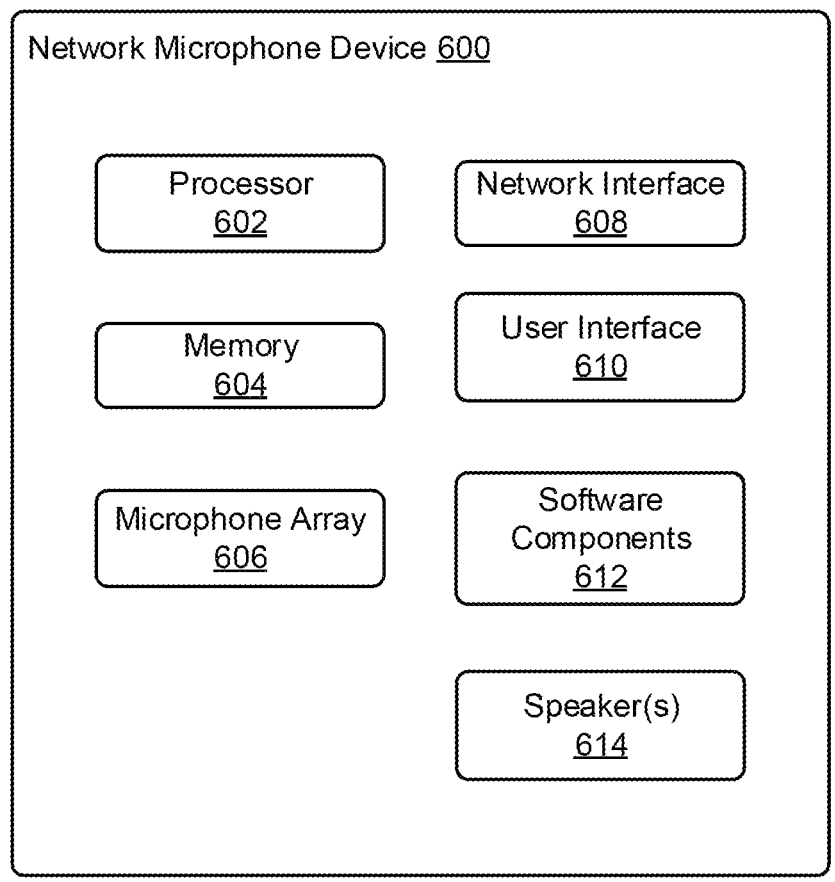
FIG. 6 is a functional block diagram of a network microphone device according to aspects described herein.

FIG. 6 shows a functional block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example System

Figure 7:
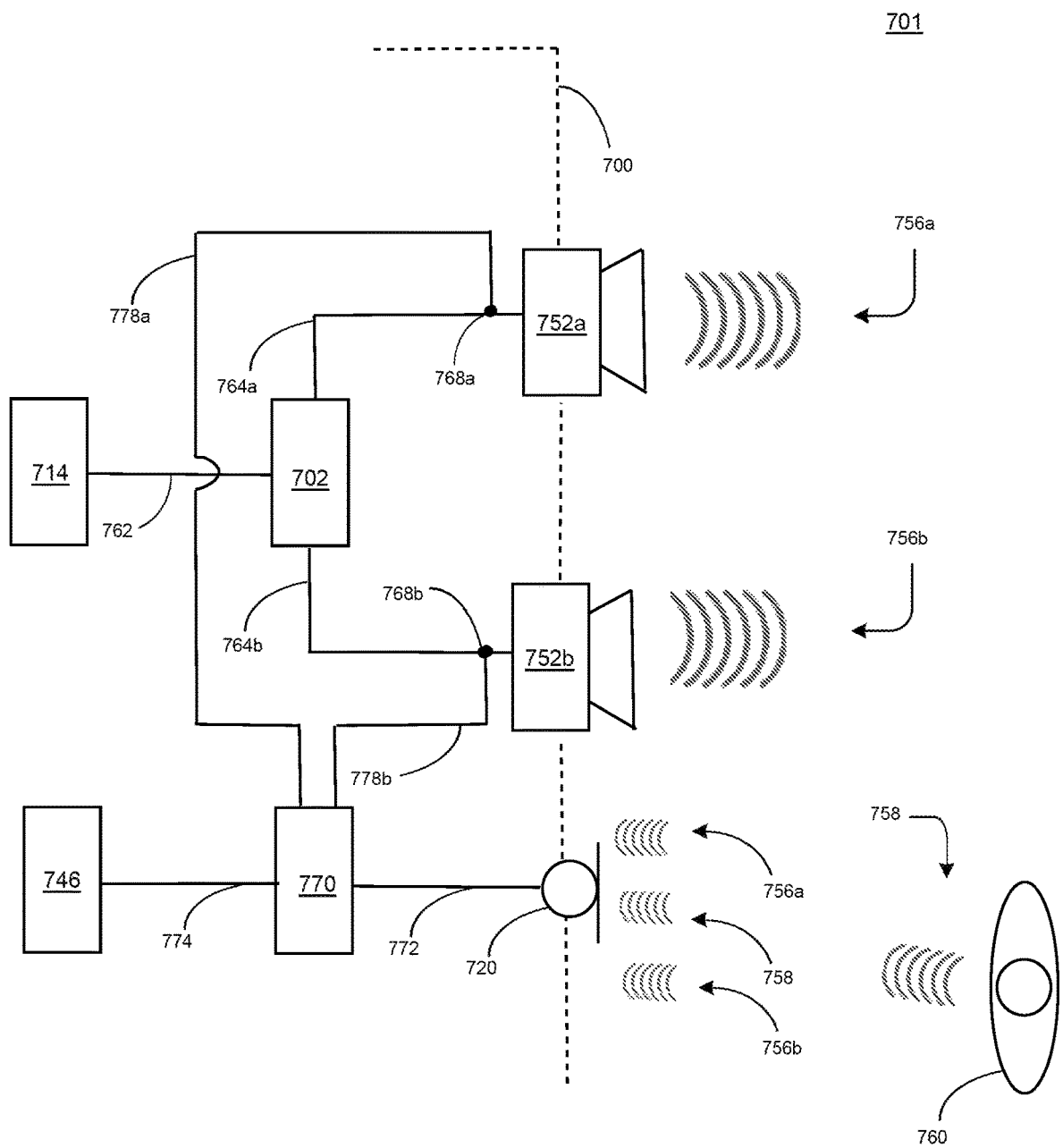
FIG. 7 is a schematic diagram of an example environment in which a playback device may be located.

Embodiments described herein involve performing multi-channel acoustic echo cancellation on a stream of audio captured by at least one microphone of a playback device capable of playing back audio content via a first speaker driver and a second speaker driver. FIG. 7 illustrates such an example environment 701 in which such a playback device may be located in accordance with disclosed embodiments. The example environment 701 may be, for example, a living room or bedroom of a home, and the playback device 700 may be capable of outputting audio content in one or more directions via two or more speakers (e.g., a first speaker driver 752a and a second speaker driver 752b). The audio content may be provided by the computing device 508 via the cloud network 502. For example, the computing device may be a music service provider such as Spotify, Amazon Music, Pandora, among others, and the cloud network may be a wide area network (WAN) such as the Internet.

Figure 8:
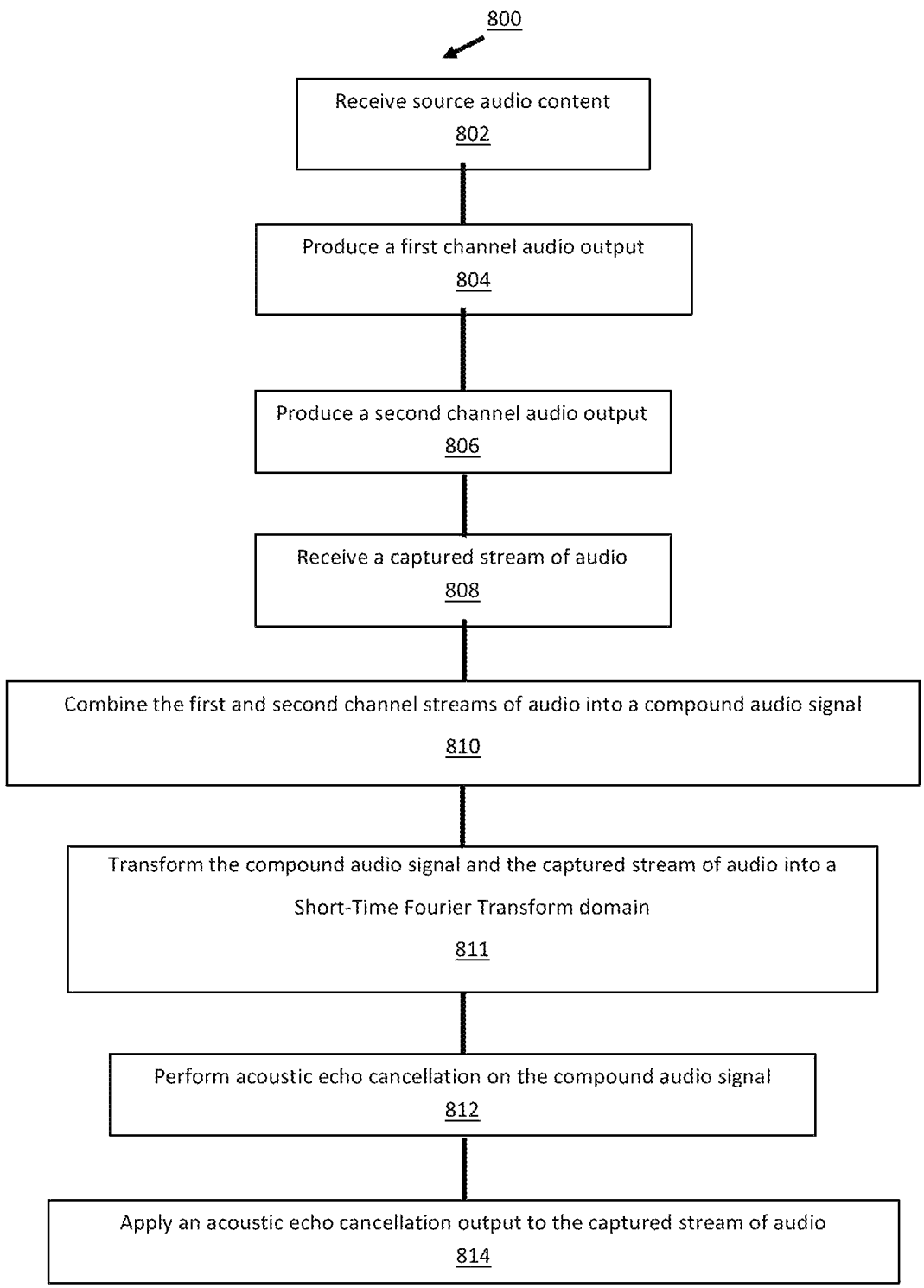
FIG. 8 is a flow diagram of a method of operating a playback device according to aspects described herein.

The playback device 700 has one or more microphones 720 configured to capture and/or record audio. The one or more microphones 720 may be proximate the playback device 700. For example, the microphone 720 may be co-located physically on and/or in the playback device 700, or wired or wirelessly connected to the playback device 700. In some embodiments, a microphone (not shown) may be located remote from the playback device 700 in the room 700. For example, the microphone may be located on, for example, a network device that may be a controller device, NMD, or another audio playback device. In some embodiments, the audio recorded at the audio playback device 700 (or at the network device) may include source audio content and may be used to determine an estimated frequency response of the playback device (i.e., a self-response), and the self-response may be used to calibrate the audio playback device.

a. Example of Performing Acoustic Echo Cancellation Using a Compound Audio Signal FIG. 8 is a flow diagram of a method 800 of performing multi-channel acoustic echo cancellation in accordance with a disclosed embodiment. Methods and the other process disclosed herein may include one or more operations, functions, or actions. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, each block in the figures may represent circuitry that is wired to perform the specific logical functions in the process.

In one example, the playback device 700, which may be identical to the playback device 200, at least partially performs the disclosed functions for multi-channel acoustic echo cancellation. In another example, the computing device 504-508 at least partially performs the disclosed functions for multi-channel acoustic echo cancellation. In yet another example, the controller device 300 performs functions for multi-channel acoustic echo cancellation. In another example, functions for performing multi-channel acoustic echo cancellation may be at least partially performed by one or more NMD 512-516. Other arrangements are also possible.

In the illustrated embodiment of FIG. 8, the method 800 for operating the playback device 700 of FIG. 7 is shown. Briefly, at 802, the playback device 700 receives a source stream of audio. The network interface 714 of the playback device 700 (which corresponds to the network interface 214 of FIG. 2) receives the source stream of audio, and the source stream of audio includes source audio content to be played back by the playback device 700. The source audio content includes a first channel stream of audio and a second channel stream of audio.

At 804, the playback device 200 may play back, via the first speaker driver 752a, the first channel stream of audio, thereby producing a first channel audio output 756a, as illustrated in FIG. 7. At 806, the playback device 200 may play back, via the second speaker driver 752*b*, the second channel stream of audio, thereby producing a second channel audio output 756*b*, as illustrated in FIG. 7. At 808, the microphone 720 receives or captures a captured stream of audio from the environment 701 of the playback device 700 and stores data indicative of the captured audio in the captured stream of audio. The captured stream of audio may include a first portion corresponding to the first channel audio output 756*a*, a second portion corresponding to the second channel audio output 756*b*, and a third portion corresponding to a vocal command 758 issued by a user 760. The captured stream of audio has a first signal-to-noise ratio.

At 810, the first channel stream of audio and the second channel stream of audio are combined into a compound audio signal. At 811, the compound audio signal and the captured stream of audio is transformed into a Short-Time Fourier Transform domain. At 812, acoustic echo cancellation is performed on the compound audio signal, and performing acoustic echo cancellation on the compound audio signal produces an acoustic echo cancellation output. At 814, the acoustic echo cancellation output is applied to the captured stream of audio, thereby increasing the signal-to noise ratio of the captured stream of audio from the first signal-to-noise ratio to a second signal-to-noise ratio, and the second signal-to-noise ratio is greater than the first signal-to-noise ratio.

Starting at 802, the network interface 214 receives the source of stream of audio via a wireless connection, a wired connection, and/or another suitable means of transmission. The source stream of audio may include or correspond to source audio content to be played back by the playback device 200. In the embodiment of FIG. 7, one or more communication links 762 connects the network interface 214 to one or more processors 702 of the playback device 200, and the one or more communication links 762 provides the source stream of audio to the one or more processors 702. The source stream of audio may include or may be partitioned into any number of suitable channel streams of audio to play back the source audio content on the playback device 200. In the embodiment of FIG. 7, the source stream of audio may include a first channel stream of audio and a second channel stream of audio. One or more first channel communication links 764*a* connects the one or more processors 702 of the playback device 200 to the first speaker driver 752*a*, and the one or more first channel communication links 764*a* provides the first channel stream of audio to the first speaker driver 752*a*. In addition, one or more second channel communication links 764*b* connects the one or more processors 702 of the playback device 700 to the second speaker driver 752*b*, and the one or more second channel communication links 764*b* provides the second channel stream of audio to the second speaker driver 752*b*. In other embodiments, the source audio content may further include a third channel stream of audio and/or additional (e.g., a fourth, a fifth,) streams of audio, and one or more corresponding channel communication links may connect the one or more processors 702 of the playback device 700 to the corresponding speaker driver. The one or more communication links 762, 764*a*, 764*b* may take the form of traces on a printed circuit board. For example, if the playback device 200 includes two speakers (or speaker drivers), a first transducer or speaker driver 752*a* (e.g., a right speaker) can be configured to play back the first channel stream of audio and a second transducer or speaker driver 752*b* (e.g., a left speaker) can be configured to play back the second channel stream of audio. Thus, in this example configuration, the first and second speaker drivers 752*a*, 752*b* may cooperate to play back the source audio content in two-channel stereo sound. As another example, if the playback device 700 includes three speakers, the first speaker driver 752*a* (e.g., a right speaker) of the playback device 700 may play back (or may be configured to play back) the first channel stream of audio, the second speaker driver 752*b* (e.g., a left speaker) of the playback device 700 may play back (or may be configured to play back) the second channel stream of audio, and the third speaker driver (e.g., a center speaker, a midrange speaker, a woofer) of the playback device 700 may play back (or may be configured to play back) the third channel stream of audio. In a further example configuration, a first speaker driver 752*a* (e.g., a center speaker) of the playback device 700 may play back (or may be configured to play back) the first channel stream of audio, the second speaker driver 752*b* (e.g., a right speaker) of the playback device 700 may play back (or may be configured to play back) the second channel stream of audio, and the third speaker driver 752*c* (e.g., a left speaker) of the playback device 700 may play back (or may be configured to play back) the third channel stream of audio. In these example configurations, the first, second, and third speaker drivers may cooperate to play back the source audio content in three-channel stereo sound. Any number of additional speakers and corresponding additional streams of audio comprising source audio content are contemplated.

The source stream of audio (and/or the first channel stream of audio, the second channel stream of audio, the third channel stream of audio, and any other additional channel stream of audio associated with the steam of audio) may be segmented into one or more chunks of data. For example, the chunks may take the form of packets of digital samples of audio content. These chunks of data may be stored on the playback device 700 performing the multi-channel acoustic echo cancellation and/or stored on a computing device associated with the multi-channel acoustic echo cancellation.

Figure 9:
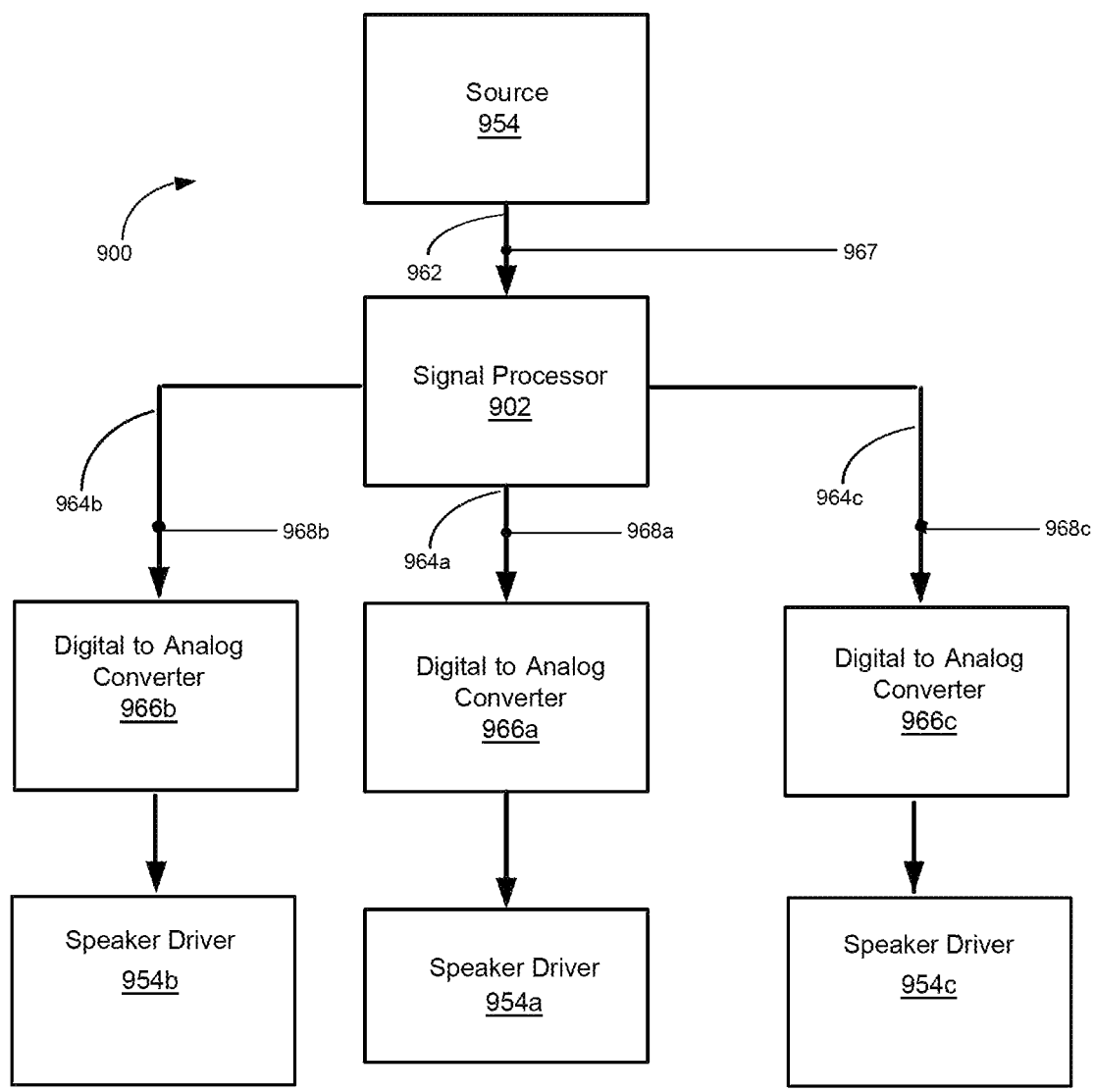
FIG. 9 is a block diagram of an audio pipeline of a playback device.

FIG. 9 is a block diagram of an audio pipeline 900 configured to receive or play back a source stream of audio. The audio pipeline 900 includes a source 954 and a signal processor 902, which may be any signal processor associated with the playback device 700, such as the processor 702. A first digital to analog converter 966*a* and a first speaker driver 952*a* are coupled to the signal processor 902 via one or more communication links 964*a*. The one or more communication links 964*a* may correspond to all or part of the first channel communication link 764*a* of FIG. 7 and the first speaker driver 952*a* may correspond to the first speaker driver 752*a* of FIG. 7. A second digital to analog converter 966*b* and a second speaker driver 952*b* are coupled to the signal processor 902 (and/or another signal processor (not shown)) via one or more communication links 964*b*, and the one or more communication links 964*a* may correspond to all or part of the second channel communication link 764*b* of FIG. 7 and the second speaker driver 952*b* may correspond to the second speaker driver 752*b* of FIG. 7. In the illustrated embodiment, a third digital to analog converter 966*c* and a third speaker driver 952*c* are coupled to the signal processor 902 (and/or another signal processor) via one or more communication links 964*c*. In some embodiments, however, fewer or additional digital to analog converters and associated speaker drivers may be coupled to the signal processor 902 (and/or another signal processor) via one or more communication links.

As illustrated in FIG. 9, the audio pipeline 900 is disposed on or incorporated into the playback device 700. However, the audio pipeline 900 may be disposed on or incorporated into a controller device, computing device, NMD, or a combination thereof. In the case of the audio pipeline 900 residing on the playback device 700, the communication links may take the form of traces on a printed circuit board. In the case of the audio pipeline residing on the combination thereof, the communication links may take the form of a wired or wireless network such as an Ethernet or WiFi network. In some embodiments, all or portions of the audio pipeline 900 may be disposed on or incorporated into a housing of the playback device.

The source 954 may be a storage device such as memory or a hard drive which stores source audio content. Alternatively, the source 954 may be a computing device such as a music service provider which stores and provides the source audio content to the audio playback device. The source audio content may take the form of an audio file of digital samples defining audio content in a time domain. The source 954 may be located on or along one or more communication links 962 (corresponding to communication links 762 of FIG. 7) connecting the network interface 714 to one or more processors 702 of the playback device 700.

The signal processor 902 may apply one or more filtering algorithms to the source audio content prior to the audio playback device outputting an audio signal. The filtering algorithms may vary based one or more of a volume setting of the playback device, previous calibration of the playback device, device orientation, content type, etc. Further, the signal processor 902 may include one or more of a sample rate converter, bit depth converter, and channel up/down mixer. The sample rate converter may change a sample rate of the source audio content. The sample rate may define a number of samples representing the source audio content per unit time. The bit depth converter may change a bit depth of the source audio content signal. The bit depth may be a number of bits used to represent a digital sample. The channel up/down mixer may mix source audio content from different channels such as a left and right channel of stereo sound. The signal processor 902 may perform other functions as well.

In some embodiments, the signal processor 902 may process the source audio content in a digital domain and output a processed digital signal. The first, second, and third digital to analog converters 966a, 966b, 966c may convert the digital signal of the signal processor 902 (e.g., the digital signal of the first channel stream of audio, the second channel stream of audio, and the third channel stream of audio) to an analog signal (e.g., a first channel analog signal, a second channel analog signal, and a third channel analog signal). The analog signal may be output to a corresponding one of the first, second, and/or third speaker drivers 954a, 954b, 954c, which converts the analog signal to audible audio. For example, the audio output may include the first channel audio output 756a (illustrated in FIG. 7) corresponding to the first channel stream of audio being played back by the first speaker driver 954a, the second channel audio output 756b (illustrated in FIG. 7) corresponding to the second channel stream of audio being played back by the second speaker driver 954b, and the third channel audio output corresponding to the third channel stream of audio being played back by the third speaker driver 956c.

The source audio content (e.g., the first channel stream of audio and the second channel stream of audio) that is used in multi-channel acoustic echo cancellation may be received at a tap 967 and/or taps 968a, 968b, 968c of FIG. 9. Each tap 967, 968a-968c may be an end portion of a communication link that extends between the processor performing acoustic echo cancellation (e.g., the processor 770) and a corresponding one of the first, second, or third channel communication link 964a-964c. The tap 968a may be disposed on a portion of the first channel communication link 964a between the signal processor 902 and the first digital to analog converter 966a, and the tap 968a may be disposed as close as possible to the first digital to analog converter 966a. Similarly, the tap 968b may be disposed on a portion of the second channel communication link 964b between the signal processor 902 and the second digital to analog converter 966b, and the tap 968b may be disposed as close as possible to the second digital to analog converter 966b. Additionally, the tap 968c may be disposed on a portion of the third channel communication link 964c between the signal processor 902 and the third digital to analog converter 966c, and the tap 968c may be disposed as close as possible to the third digital to analog converter 966c. In the case that the source audio content is received at the tap 967, then processing that would otherwise be applied by the signal processor 902 may need to be applied to the source stream of audio prior to performing multi-channel acoustic echo cancellation which is discussed below.

As illustrated in the example configuration of FIG. 7, the tap 768a (which corresponds to tap 968a of FIG. 9) is an end portion of a communication link 778a that extends between a portion of the first channel communication link 764a and the processor 770, and the communication link 778a provides the first channel stream of audio to the processor 770 that performs acoustic echo cancellation. Also illustrated in FIG. 7, the tap 768b (which corresponds to tap 968b of FIG. 9) is an end portion of a communication link 778b that extends between a portion of the second channel communication link 764b and the processor 770, and the communication link 778b provides the second channel stream of audio to the processor 770 that performs acoustic echo cancellation. In other embodiments, a tap corresponding to tap 968b of FIG. 9 may be an end portion of a communication link (not shown) that extends between a portion of a third channel communication link (corresponding to communication link 968c of FIG. 9) and the processor 770, and the communication link provides the third channel stream of audio to the processor 770 that performs acoustic echo cancellation. Further communication links may be linked to the processor 770 if further speaker drivers are included in the playback device 700.

At 808, the microphone of the playback device 700 receives captured audio comprising digital signals converted from analog signals by an analog-to-digital converter associated with the microphone. The captured audio may be recorded, captured, and/or stored by the microphone of the playback device 700, network device controller device, NMD, or another audio playback device in any suitable manner. In some embodiments, the microphone 720 may be one of an array of microphones. The captured stream of audio may include any noise or audible event within the detectable frequency range of the microphone. For example, as illustrated in FIG. 7, a user 760 may speak a vocal command 758 that is directed to the playback device 700, and the vocal command 758 is captured by the microphone 720 such that the captured stream of audio includes the vocal command 758 issued to the playback device 200. In some embodiments, particularly in the embodiment of FIG. 7, the vocal command 758 may be issued when the playback device 700 is playing back a source stream of audio. Accordingly, the captured stream of audio may include a portion corresponding to the vocal command 758 and also include a first portion corresponding to the first channel audio output 756a played by the first speaker driver 752a, a second portion corresponding to the second channel audio output 756*b* played by the second speaker driver 752*b*, and in some embodiments, a portion corresponding to the third channel audio output played by the third speaker driver. The captured stream of audio may therefore have a first signal to noise ratio.

The first portion, the second portion, the portion corresponding to the third channel audio output, and the portion corresponding to the vocal command 758 of the captured stream of audio may be a time domain representation of the audio content output (e.g., the first channel audio output, the second channel audio output, and the third channel audio output) by the playback device 700. The captured stream of audio may be segmented into one or more chunks of data, e.g., packets. The captured stream of audio may be stored on the playback device 200 or passed to another network device, such as a computing device, another playback device, control device or NMD.

The playback device 700 that is performing the multi-channel acoustic echo cancellation may record or capture all or a portion of the captured stream of audio. The captured stream of audio may be recorded via at least one microphone 720 (e.g., one or more of a microphone array 606) co-located on the playback device 700, or the captured stream of audio may be recorded via one or more microphones in a spatially different location from the playback device. For example, another playback device may record the captured stream of audio, a network device may receive this captured stream of audio, and/or a NMD may record this captured stream of audio. The captured stream of audio may include a signal derived from the captured stream of audio by one or more operations by a processor.

As shown at 810, the first channel stream of audio, the second channel stream of audio (and in some embodiments, the third channel stream of audio) may be combined or mixed into a compound audio signal. For example, the compound audio signal may be the sum of the first channel stream of audio, the second channel stream of audio, and the third channel stream of audio. In some embodiments, the first channel stream of audio, the second channel stream of audio, and the third channel stream of audio may be converted from the time domain to the frequency domain (via a Fourier transform or other known methods) and the compound audio signal may be the sum of the first channel stream of audio, the second channel stream of audio, and the third channel stream of audio in the frequency domain. The compound audio signal may be further processed in the frequency domain or may be transformed into the time domain in any suitable or known manner for further processing.

The first, second, and third channel stream of audio may be combined or mixed into the compound audio signal by a processor disposed on or within a housing of the playback device 700, such as the processor 702 or the audio processing components 208, and/or any other processor component associated with the playback device. Alternatively, the first, second, and third channel stream of audio may be combined or mixed into the compound audio signal by a processor disposed remote from the playback device 200.

At 812, one or more processors associated with the playback device 700 performs acoustic echo cancellation on the compound audio signal, and performing acoustic echo cancellation on the compound audio signal produces or results in an acoustic echo cancellation output. At 814, one or more processors associated with the playback device 200 applies the acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

The one or more processors that performs acoustic echo cancellation may be the same processor that applies the acoustic echo cancellation output to the captured stream of audio. In the embodiment of FIG. 7, the one or more processors may include processor 770. In other embodiments, the one or more processors may include the processor 702, the audio processing components 208 (illustrated in FIG. 2), and/or any other processor component associated with the playback device 700 or any other device. In some embodiments, the processor that performs acoustic echo cancellation may be different than the processor that applies the acoustic echo cancellation output to the captured stream of audio, and either may be the processor 702 of the processor 770. In the embodiment of FIG. 7, one or more microphone communication links 772 connects the processor 770 of the playback device 700 to the microphone 720, and the one or more microphone communication links 772 provides the captured stream of audio to the processor 770. Thus, the captured stream of audio transmitted via the communication link 772 may have a first signal to noise ratio. In embodiments with two or more microphones, one or more further microphone communication links connects each additional microphone to the processor 770 (or any other processor) of the playback device 700 to provides the captured stream of audio associated with each microphone to the processor 770.

Performing the acoustic echo cancellation to produce an acoustic echo cancellation output and applying the acoustic echo cancellation output to the captured stream of audio may be performed in any manner. Generally speaking, acoustic echo cancellation involves two inputs: (1) a signal recorded by the microphone (here, the captured stream of audio); and (2) a reference signal (or reference signals) typically taken from a point in the audio playback pipeline, such as the example of FIG. 9, that most closely represents the analog audio expected to be output by the speakers (here, the compound audio signal). The acoustic echo cancellation then attempts to determine a transfer function (also called a filter) that transforms the reference signal into the recorded microphone signal with minimal error. Inverting the resulting output of the acoustic echo cancellation and mixing it with the signal recorded by the microphone causes a redaction of the reference signal from the signal recorded by the microphone. Thus, the "signal" of a user's voice input (the vocal command 758) remains in the processed captured stream of audio, and the "noise" of the audio output (the first channel audio output 756*a* and the second channel audio output 756*b*) from the speakers of the playback device 700 is reduced or removed. That is, after applying the acoustic echo cancellation output to the captured stream of audio to result in the second signal-to-noise ratio, the second signal-to-noise ratio will be greater than the first signal-to-noise ratio associated with the captured stream of audio prior to the application of the acoustic echo cancellation output.

Applying the transfer function to the reference signal can account for factors (e.g., echo in a room, non-linear response of audio output transducers) that could cause the acoustic echo cancellation to become destabilized. In some embodiments, the transfer function may exist for each channel to each microphone (which may be one of an array of microphones) and each speaker driver to each microphone.

To reduce processing requirements, processing associated with acoustic echo cancellation may be performed in the Short-Time Fourier Transform ["STFT"] domain. Thus, at 811, the reference signal (here, the compound audio signal) and the signal recorded by the microphone 720 (here, the captured stream of audio) are transformed into a STFT domain. The compound audio signal and the captured stream of audio may be transformed into a STFT by one or more processors associated with the playback device 700, and the compound audio signal and the captured stream of audio may be transformed into a STFT domain prior to performing acoustic echo cancellation and/or applying the acoustic echo cancellation output to the captured stream of audio.

In addition, the acoustic echo cancellation algorithm may include or involve one or more adaptive cross-band filters that involve optimized sub-processes that further reduce computational complexity. The cross-band filters eliminate the need for convolution of a Fast Fourier Transform algorithm, which achieves an accurate response while conserving processing power.

Turning to acoustic echo cancellation in more detail, the reference signal (here, the compound audio signal) may be in the frequency domain, and the signal captured or recorded by the microphone 720 (here, the captured stream of audio) may be converted from the time domain to the frequency domain using a Fourier transform, for example. The compound audio signal and the captured stream of audio may be each represented as a vector of data with a magnitude and phase in the frequency domain. A transfer function may be a difference between the compound audio signal vector (S) and the captured stream of audio vector (M).

This transfer function may be calculated based on an adaptive echo cancellation algorithm. The characteristic equation for adaptive echo cancellation may be represented as:

$$M = [S*H + X] \qquad (1)$$

where M is a complex vector in the frequency domain representing a magnitude and phase of the captured stream of audio;

S is a complex vector in the frequency domain representing a magnitude and phase of the compound audio signal vector;

H is a complex transfer function in the frequency domain representing a difference between the S and M in the absence of any recorded interference in M; and X represents the recorded interference, e.g., static noise (e.g., buzz) or background noise (e.g., speech) in M. If there is no recorded interference in M, then M=S*X and X=0.

A real part of H, e.g., a magnitude component of the S to M transfer function may be calculated as:

$$\mathrm{mag}H_n = (\mathrm{mag}S_n - \mathrm{mag}M_n)a_n + (1 - a_n)(\mathrm{mag}H_{n-1}) \qquad (2)$$

where a is a signal to interference ratio, e.g., the signal may be S and the interference may be the recorded interference X. a may be represented as a function of a logarithmic value normalized between 0 and 1;

$\mathrm{mag}S_n$ is a magnitude component vector of the compound audio signal vector;

$\mathrm{mag}M_n$ is a magnitude component vector of the captured stream of audio vector; and n is an iteration.

With each iteration, a magnitude component vector of the captured stream of audio vector magM, a magnitude component vector of the compound audio signal magS, and the magnitude component of the S to M transfer function magH from one iteration is used to calculate the magnitude component of the S to M transfer function for the next iteration.

The following calculation may be performed for each iteration:

$$\mathrm{mag}M_n - \mathrm{mag}S_n * \mathrm{mag}H_n \qquad (3)$$

where $\mathrm{mag}M_n$ is a magnitude component vector of the captured stream of audio vector;

$\mathrm{mag}S_n$ is a magnitude component vector of the compound audio signal vector;

$\mathrm{mag}H_n$ is a magnitude component of the S to M transfer function.

As would be understood by one having ordinary skill in the art, the transfer function may converge when a result of this equation is zero or substantially zero, which indicates that the compound audio signal is removed from the captured stream of audio, leaving only a vocal command from a user, and thereby increasing the signal-to-noise ratio in the captured stream of audio. One having ordinary skill in the art would recognize that the result of the equation may alternatively converge within an acceptable range of zero, and such a range would allow for a reduction of the compound audio signal in the captured stream of audio to allow a vocal command from a user to be detected over the "noise" of the audio signal played back by the first and second speaker drivers 752a, 752b.

Accordingly, with reference to the embodiment of FIG. 7, one or more communication links 774 may connect the processor to a further component 776 (which may be the processor 702 or another processor that analyzes the captured steam of audio to determine if a vocal command 758 has been issued by a user 760 and/or to issue a command to the playback device 700 corresponding to the vocal command 758. Applying the acoustic echo cancellation output to the captured stream of audio therefore results in a second signal-to-noise ratio in the one or more communication links 774, the second signal-to-noise ratio being greater than the first signal-to-noise ratio associated with the captured stream of audio prior to the application of the acoustic echo cancellation output (e.g., the captured stream of audio prior transmitted along the one or more communication links 772). Thus, the vocal command 758 of a user remains in the captured stream of audio for processing by the component 776 while the "noise" of the first channel audio output 756a and the second channel audio output 756b is reduced or removed.

The increase in the signal-to-noise ratio may depend on any or all of several factors, such as the play back volume of the first channel audio output 756a and the second channel audio output 756b and on the size, dimension, acoustics, etc. of the room where the playback device 700 is located. In some embodiments, the difference between the second signal-to-noise ratio and the first signal-to-noise ratio may be within the range of 10 db (or approximately 10 dB) to 20 dB (or approximately 20 dB).

By combining the first channel stream of audio and the second channel stream of audio (and, optionally, the third and additional streams of audio) into the compound audio signal, the acoustic echo cancellation process can be performed on only the compound audio signal and not on each of the first, second, and third channel streams of audio. Thus, the acoustic echo cancellation is simplified, thereby realizing a suitably large signal-to-noise ratio using a less-complex algorithm without a costly upgrade to the currently-used playback device CPU.

b. Example of Performing Acoustic Echo Cancellation on Signals in Parallel

Figure 10:
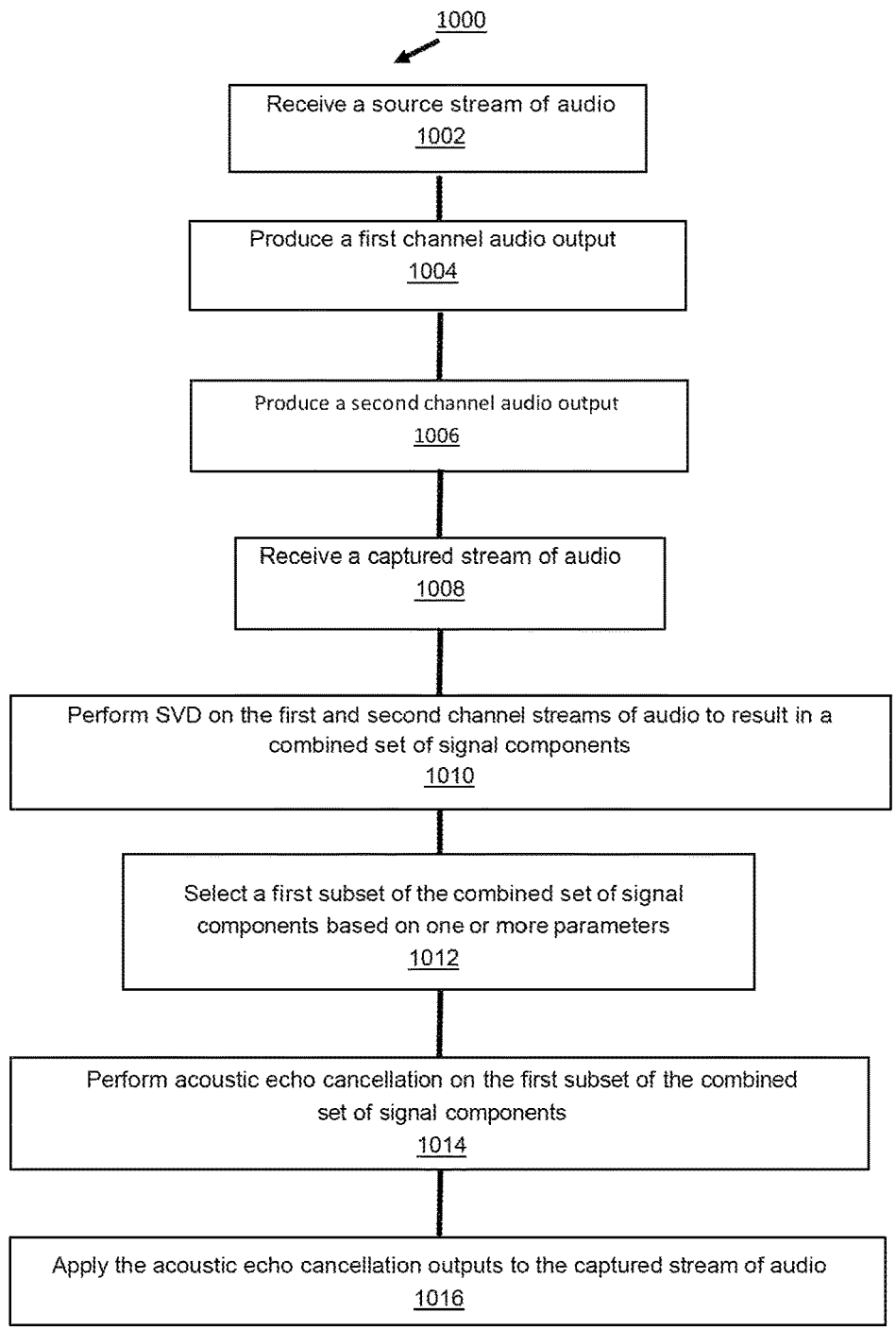
FIG. 10 is a flow diagram of a method of operating a playback device.

In some embodiments, acoustic echo cancellation may be performed on the first and second (and third, etc.) channel streams of audio in parallel. That is, a processor may perform acoustic echo cancellation on the first channel stream of audio to result in a first acoustic echo cancellation output, a processor may perform acoustic echo cancellation on the second channel stream of audio to result in a second acoustic echo cancellation output, and, optionally, a processor may perform acoustic echo cancellation on the third channel stream of audio to result in a third acoustic echo cancellation output. The one or more processors may perform acoustic echo cancellation on the first channel stream of audio in parallel with the second channel stream of audio and, optionally, the third channel stream of audio. The parallel processing may be performed in any known manner. The one or more processors may then apply the first acoustic echo cancellation output, the second acoustic cancellation output, and, optionally, the third acoustic cancellation output to the captured stream of audio, thereby increasing the signal-to noise ratio of the captured stream of audio from the first signal-to-noise ratio to a second signal-to-noise ratio, and the second signal-to-noise ratio is greater than the first signal-to-noise ratio.

c. Example of Performing Acoustic Echo Cancellation Using Singular Value Decomposition In other embodiments, singular value decomposition ("SVD") may be incorporated into the acoustic echo cancellation process to reduce computational complexity while realizing an improved signal-to-noise ratio. An exemplary method 1000 for operating the playback device 700 that incorporates SVD is illustrated in FIG. 10.

At 1002, a playback device 700 (such as the playback device 700 illustrated in FIG. 7) receives a source stream of audio, and the playback device 700 has a first speaker driver 752*a*, at least a second speaker driver 752*b*, and at least one microphone 720, as previously described. As previously explained, the playback device 700 may include a third speaker driver and any number of additional speaker drivers. The source stream of audio is received via the network interface 714 of the playback device 700, and the source stream of audio includes source audio content to be played back by the playback device 700, as previously explained. The source audio content includes a first channel stream of audio, a second channel stream of audio, and, optionally, a third channel stream of audio or additional channel streams of audio, as previously explained.

At 1004, the playback device 700 plays back, via the first speaker driver 752*a*, the first channel stream of audio, thereby producing a first channel audio output 756*a*, as previously described. At 1006, the playback device 700 plays back, via the second speaker driver 752*b*, the second channel stream of audio, thereby producing a second channel audio output 756*b*, as previously described. Also as previously described, the playback device 700 may play back, via the third speaker driver, the third channel stream of audio, thereby producing a third channel audio output. Further speaker drivers of the playback device 200 may playback further channel streams of audio, thereby producing further channel audio outputs.

At 1008, a microphone 720 receives or captures the stream of audio. As previously described, and with reference to the embodiment of FIG. 7, the captured stream of audio is transmitted via the communication link 772 to the processor 770. The captured stream of audio may include a first portion corresponding to the first channel audio output 756*a*, a second portion corresponding to the second channel audio output 756*b*, and a portion corresponding to a vocal command 758 issued by a user 760, and the captured stream of audio has a first signal-to-noise ratio. As previously explained, the captured stream of audio may also include a third portion corresponding to the third channel audio output and additional portions corresponding to additional channels of audio output.

At 1010, one or more processors associated with the playback device 700 performs an SVD on the first channel stream of audio, the second channel stream of audio and, optionally, the third channel streams of audio (that is, to a union of the first, second, and third channel streams of audio) to result in a combined set of signal components. In some embodiments, the one or more processors associated with the playback device 700 may perform an SVD on the first channel stream of audio, the second channel stream of audio and, optionally, the third channel streams of audio simultaneously.

In other embodiments, one or more processors associated with the playback device 700 may perform an SVD separately on the first channel stream of audio to result in a first set of signal components and on the second channel stream of audio to result in a second set of signal components. Optionally, one or more processors associated with the playback device 700 may also separately perform an SVD on the third channel stream of audio to result in a third set of signal components and, if appropriate, on additional channel streams of audio to result in corresponding additional sets of signal components.

At 1012, one or more processors associated with the playback device 700 selects or determines a first subset of the combined set of signal components based on one or more parameters. In some embodiments, the one or more processors associated with the playback device 700 may select or determine a second subset (and further subsets) of the combined set of signal components based on one or more parameters.

In other embodiments, one or more processors associated with the playback device 700 may select or determine a subset of the first set of signal components based on one or more parameters, and one or more processors associated with the playback device 700 may select or determine a subset of the second set of signal components based on one or more parameters. Optionally, one or more processors associated with the playback device 700 may select or determine a subset of the third (and additional) set of signal components based on one or more parameters. Any or all of the one or more parameters of the subset of the second set of signal components or the subset of the third (or additional) set of signal components may correspond to any or all of the one or more parameters of the subset of the first set of signal components.

In an SVD, data is represented in a statistical domain rather than in a time or frequency domain, and the data is projected onto a set of axes that are based on a statistical criterion and are therefore not fixed. The representation of the data in SVD effectively separates the data into separate sources to reveal significant structure(s) in the projections. In some examples, performing an SVD on a set of data, such as the first, second, and third channel stream of audio, may reveal indicators (e.g., peaks) at a certain frequency or time, and these indicators may correspond to a strong component (e.g., strong energy content) of the signal at the corresponding frequency or time. Projections that correspond to unwanted sources (e.g., weak energy content) may then be ignored or discarded. The desired data can then be projected back into the original domain or space, thereby reducing the amount of information included in the original data set. As would be appreciated by one having ordinary skill in the art, performing acoustic echo cancellation on the filtered subset of the original data (such as a subset having an energy content above a threshold energy content and/or a calculated variance above a threshold variance) requires less processing resources than performing acoustic echo cancellation on the entire set of the original data.

In an example of how SVD may be performed, the SVD theorem provides:

$$A = USV^T$$

where $U^T U = I$ $V^T V = I$ (i.e., U and V are orthogonal)

A is a M×N matrix that may correspond to or be associated with one of the first channel stream of audio, the second channel stream of audio, and/or the third channel stream of audio (and/or any further channel streams of audio). The rows and columns of A may be associated with the data and the experimental conditions. For example, the data in A may correspond to or include N audio waveforms that may each be M samples long. U is an M×M matrix having columns that are left singular vectors, S is an M×N matrix that has singular values and is diagonal, and $V^T$ has rows that are right singular vectors. The SVD represents an expansion of the original data in a coordinate system where the covariance matrix is diagonal.

Calculating the SVD consists of finding the eigenvalues and eigenvectors of $AA^T$ and $A^T A$. The eigenvectors of $A^T A$ make up the columns of V and the eigenvectors of $AA^T$ make up the columns of U. Also, the singular values in S are square roots of eigenvalues from $AA^T$ or $A^T A$. The singular values are the diagonal entries of S and are arranged in descending order. The singular values are always real numbers. If A is a real matrix, then U and V are also real.

Values of S that are below a threshold value can be ignored or set to 0, and therefore corresponding values in portions of U and V can also be ignored to set to 0. Thus, when projected back into the original domain or space the amount of information included in the data set is reduced, thereby simplifying the acoustic echo cancellation process.

The subsets of the combined set of signal components (or the subsets of the first, second, and third set of signal components) may be selected or determined based on any or all of several parameters. These parameters may correspond to threshold values such that signal components above the threshold value (which correspond to relatively strong or intense components) are selected and included in the corresponding subset. For example, one parameter may be energy content, and signal components having an energy content above a first threshold energy content may be selected for the subset. In some embodiments, one parameter may be variance, and signal components having a calculated variance above a first threshold variance may be selected for the subset. In some embodiments, all signal components having an energy content above a first threshold energy content and a calculated variance above a first threshold variance may be selected for the subset. In some embodiments, any given subset may be selected from any or all of the first, second, or third set of signal components. For example, only the third set of signal components may have signal components having an energy content above the first threshold energy content, and the first and second set of signal components may have signal components having an energy content less than or equal to the first threshold energy content.

Accordingly, in some embodiments, a first subset of the combined set of signal components may have at least one of (a) an energy content above a first threshold energy content or (b) a calculated variance above a first threshold variance may be selected. Additionally, a second subset of the combined set of signal components may have at least one of (a) an energy content above a second threshold energy content or (b) a calculated variance above a second threshold variance. Each of the first and second threshold energy content may be different, and each of the first and second threshold variance may be different.

In other embodiments, a subset of the first set of signal components may have at least one of (a) an energy content above a first threshold energy content or (b) a calculated variance above a first threshold variance may be selected, and a subset of the second set of signal components may have at least one of (a) an energy content above a second threshold energy content or (b) a calculated variance above a second threshold variance. In some embodiments, a subset of the third set of signal components may have at least one of (a) an energy content above a third threshold energy content or (b) a calculated variance above a third threshold variance. Each of the first, second, and third threshold energy content may be identical, or one or more may be unique. In addition, each of the first, second, and third threshold variance may be identical, or one or more may be unique.

At 1014, one or more processors associated with the playback device 700 performs acoustic echo cancellation on the first subset of the combined set of signal components, and performing acoustic echo cancellation on the first subset of the combined set of signal components produces a first acoustic echo cancellation output. In some embodiments, the one or more processors associated with the playback device 700 may also perform acoustic echo cancellation on the second subset of the combined set of signal components. The one or more processors associated with the playback device 700 may perform acoustic echo cancellation on the first subset of the combined set of signal components and the second subset of the combined set of signal components (and any other subsets) simultaneously to produce the first acoustic echo cancellation output. However, the one or more processors associated with the playback device 700 may perform acoustic echo cancellation on the first subset of the combined set of signal components and the second subset of the combined set of signal components (and any other subsets) in any order to produce a first acoustic echo cancellation output, a second acoustic echo cancellation output, and further acoustic echo cancellation outputs.

In some embodiments, one or more processors associated with the playback device 700 performs acoustic echo cancellation on the subset of the first set of signal components, and performing acoustic echo cancellation on the subset of the first set of signal produces a first acoustic echo cancellation output. In addition, one or more processors associated with the playback device 700 performs acoustic echo cancellation on the subset of the second set of signal components, and performing acoustic echo cancellation on the subset of the second subset of signal produces a second acoustic echo cancellation output. In addition, one or more processors associated with the playback device 700 may perform acoustic echo cancellation on the subset of the third set of signal components, and performing acoustic echo cancellation on the subset of the third subset of signal components produces a third acoustic echo cancellation output. Further, one or more processors associated with the playback device 700 may perform acoustic echo cancellation on a subset of further sets of signal components, and performing acoustic echo cancellation on the subset of the further subsets of signal produces further acoustic echo cancellation outputs. As previously explained, the processor 770 may perform acoustic echo cancellation on any or all of the subset of the first set of signal components, the subset of the second set of signal components, and the subset of the third set of signal components.

At 1016, one or more processors associated with the playback device 700 apply the first acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio. In some embodiments, one or more processors associated with the playback device 700 may apply the first acoustic echo cancellation output to the recorded stream of audio, the second acoustic echo cancellation output to the captured stream of audio, and, optionally, the third acoustic echo cancellation output to the captured stream of audio, thereby increasing the signal-to noise ratio of the captured stream of audio from the first signal-to-noise ratio to the second signal-to-noise ratio. In other embodiments, one or more processors associated with the playback device 700 may further apply the additional echo cancellation output to the recorded stream of audio to increase the signal-to noise ratio of the captured stream of audio from the first signal-to-noise ratio to the second signal-to-noise ratio.

The one or more processors associated with the playback device 700 may apply the first acoustic echo cancellation output (and optionally, the second acoustic echo cancellation output and the third (and additional) acoustic echo cancellation outputs) to the recorded stream of audio in any suitable manner, such as the manner described in relation to the compound audio signal previously described. In some embodiments, two or more of the first acoustic echo cancellation output, the second acoustic echo cancellation output, and the third (and additional) acoustic echo cancellation outputs may be simultaneously applied to the recorded stream of audio. In other examples, the first acoustic echo cancellation output, the second acoustic echo cancellation output, and optionally, the third (and additional) acoustic echo cancellation outputs may be applied to the recorded stream of audio in parallel, in series, or in any combination thereof.

As previously explained, the one or more processors that performs acoustic echo cancellation may be the same processor that applies the acoustic echo cancellation output to the captured stream of audio. In some embodiments, the one or more processors may include the processor 770, the processor 702, the audio processing components 208 (illustrated in FIG. 2), and/or any other processor component associated with the playback device 700 or any other device. In some embodiments, one or more of the processors that performs acoustic echo cancellation may be different than one or more of the processors that applies the acoustic echo cancellation output to the captured stream of audio.

The acoustic echo cancellation may be performed, for example, according to one or more embodiments of the disclosed technology. The one or more processors 770 associated with the playback device 700 may apply the first acoustic echo cancellation output (and the second acoustic echo cancellation output and the third acoustic echo cancellation outputs) to the captured stream of audio to increase the signal-to noise ratio of the captured stream of audio from the first signal-to-noise ratio to the second signal-to-noise ratio. That is, with reference to the embodiment of FIG. 7, applying the first and second (and further) acoustic echo cancellation outputs to the captured stream of audio results in a second signal-to-noise ratio in the one or more communication links 774, and the second signal-to-noise ratio is greater than the first signal-to-noise ratio associated with the captured stream of audio prior to the application of the acoustic echo cancellation output (e.g., in the one or more communication links 772). Accordingly, Thus, the vocal command 758 of a user remains in the captured stream of audio for processing by the component 776 while the "noise" of the first channel audio output 756a and the second channel audio output 756b is reduced or removed.

To reduce processing requirements, processing associated with acoustic echo cancellation may be performed in the Short-Time Fourier Transform ["STFT"] domain. That is, the subset of the combined set of signal components and the captured stream of audio (and or any other signals associated with acoustic echo cancellation) may be transformed into a STFT domain. In some embodiments, the subset of the first set of signal components, the subset of the second set of signal components, the subset of the third set of signal components, and the captured stream of audio (and or any other signals associated with acoustic echo cancellation) may be transformed into a STFT domain. In addition, the adaptive cross-band filter may be used in the acoustic echo cancellation operation on any suitable set of signals. Further, the filter applied during application of the first and second (and, optionally, third) acoustic echo cancellation output to the captured stream of audio may be a compound filter comprising combined transfer functions for each channel to each microphone (which may be one of an array of microphones) and/or each speaker driver to each microphone.

Thus, by performing an SVD on the first, second, and third channel streams of audio, and by selecting a subset of the signal components based on the SVD, the most relevant signal components can be identified and the least significant signal components can be discarded. This greatly simplifies the acoustic echo cancellation operation relative to performing acoustic echo cancellation on each of the first, second, and third channel streams of audio. Thus, existing playback device CPUs can be used for the acoustic echo cancellation operation to achieve a satisfactory increase in the signal-to noise ratio of the captured stream of audio, and the increase in the signal-to-noise ratio may be within a range (or over a threshold value) that allows a vocal command 758 from a user 760 to be detected over the "noise" of the audio signal played back by the first and second speaker drivers 752a, 752b. In some examples, (and depending on the play back volume of the of the first and second channel audio outputs 756a, 756b and/or on the size, dimension, acoustics, etc. of the room where the playback device 700 is located) the difference between the second signal-to-noise ratio and the first signal-to-noise ratio may be within the range of 10 db (or approximately 10 dB) to 20 dB (or approximately 20 dB). Accordingly, the performance of the voice control associated with the playback device 700 may be improved without incurring the cost of a more powerful CPU.

d. Example of Performing Acoustic Echo Cancellation Using a Reference Channel

Figure 11:
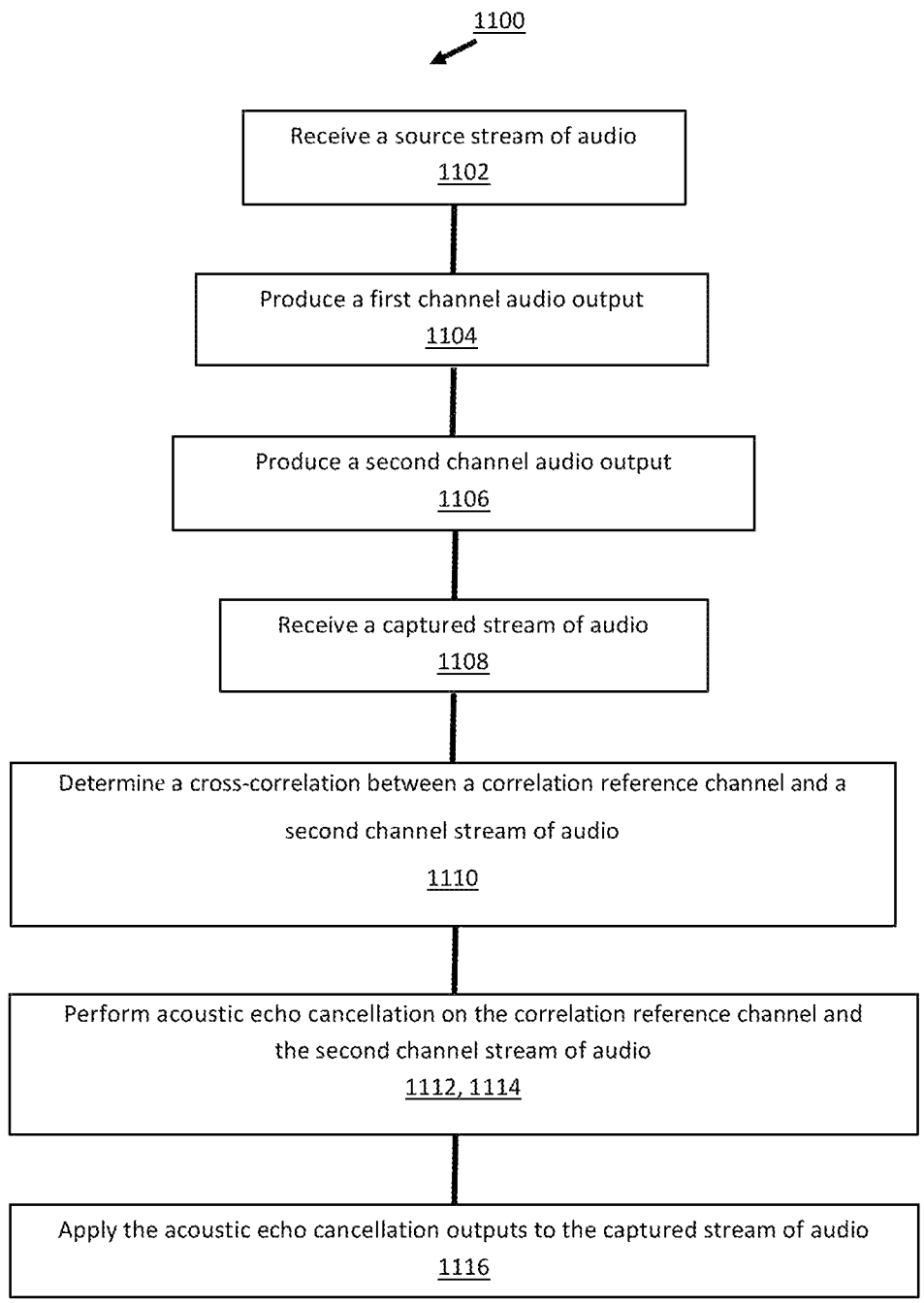
FIG. 11 is a flow diagram of a method of operating a playback device.

In other embodiments, a correlation reference channel may be incorporated into the acoustic echo cancellation process, and an exemplary method 1100 for operating the playback device 700 that incorporates a correlation reference channel is illustrated in FIG. 11. At 1102, the playback device 700 receives a source stream of audio, and the playback device has a first speaker driver 752a, at least a second speaker driver 752b, and at least one microphone 720, as previously described. As previously explained, the playback device 700 may include a third speaker driver and any number of additional speaker drivers. The source stream of audio is received via the network interface 714 of the playback device 700, and the source stream of audio includes source audio content to be played back by the playback device 700, as previously explained. The source audio content includes a first channel stream of audio, a second channel stream of audio, and, optionally, a third channel stream of audio or additional channel streams of audio, as previously explained. In some embodiments, the first channel stream of audio may be a correlation reference channel. However, in other embodiments, any of the second channel stream of audio, the third channel stream of audio, or further streams of audio may be the correlation reference channel.

At 1104, the playback device 700 plays back, via the first speaker driver 752a, the first channel stream of audio, thereby producing a first channel audio output 756a, as previously described. At 1106, the playback device 700 plays back, via the second speaker driver 752b, the second channel stream of audio, thereby producing a second channel audio output 756b, as previously described. Also as previously described, the playback device 700 may play back, via the third speaker driver, the third channel stream of audio, thereby producing a third channel audio output. Further speaker drivers of the playback device 700 may playback further channel streams of audio, thereby producing further channel audio outputs.

At 1108, a microphone 720 receives or captures the stream of audio. As previously described, the captured stream of audio may be transmitted via the communication link 772 to a processor 770. The captured stream of audio includes a first portion corresponding to the first channel audio output 756a and a second portion corresponding to the second channel audio output 756b, and a portion corresponding to a vocal command 758 issued by a user 760, and the captured stream of audio has a first signal-to-noise ratio. As previously explained, the captured stream of audio may also include a third portion corresponding to the third channel audio output and additional portions corresponding to additional channels of audio output.

At 1110, a cross-correlation between the correlation reference channel and the second channel stream of audio is determined to result in a correlated second channel signal, and the correlated second channel signal is a unique portion of the second channel stream of audio relative to the correlation reference channel. Thus, only signals unique to the second channel stream of audio (relative to the correlation reference channel) are included in the correlated second channel signal.

In some embodiments, a cross-correlation between the correlation reference channel and the third channel stream of audio is determined to result in a correlated third channel signal, and the correlated third channel signal is a unique portion of the third channel stream of audio relative to the correlation reference channel. Thus, only signals unique to the third channel stream of audio (relative to the correlation reference channel) are included in the correlated third channel signal. A cross-correlation between the correlation reference channel and any additional channel streams of audio may be determined to result in further correlated channel signals.

If the correlation reference channel is the second channel stream of audio, a cross-correlation between the correlation reference channel and the first channel stream of audio is determined to result in the correlated second channel signal. A cross-correlation between the correlation reference channel and the third channel stream of audio is determined to result in a correlated third channel signal, and the correlated third channel signal is a unique portion of the third channel stream of audio relative to the correlation reference channel. Similarly, if the correlation reference channel is the third channel stream of audio, a cross-correlation between the correlation reference channel and the first channel stream of audio is determined to result in the correlated second channel signal and a cross-correlation between the correlation reference channel and the second channel stream of audio is determined to result in the correlated third channel signal.

The cross-correlations may be performed in any manner, and any or all of the cross-correlations may be performed by a processor disposed on or within a housing of the playback device 700, such as the processor 702, the processor 770, the audio processing components 208 (illustrated in FIG. 2), and/or any other processor component associated with the playback device 700. Alternatively, any or all of the cross-correlations may be performed by a processor disposed remote from the playback device 700.

At 1112, one or more processors associated with the playback device 700 performs acoustic echo cancellation on the correlation reference channel, and performing acoustic echo cancellation on the correlation reference channel produces a first acoustic echo cancellation output. At 1114, one or more processors associated with the playback device 700 performs acoustic echo cancellation on the correlated second channel signal, and performing acoustic echo cancellation on the correlated second channel signal produces a second acoustic echo cancellation output. In addition, one or more processors associated with the playback device 700 may perform acoustic echo cancellation on the correlated third channel signal, and performing acoustic echo cancellation on the correlated third channel signal produces a third acoustic echo cancellation output. One or more processors associated with the playback device 700 may perform acoustic echo cancellation on the additional correlated channel signals, and performing acoustic echo cancellation on the additional correlated channel signal may produce additional acoustic echo cancellation outputs. As previously explained, the processor 770 may perform acoustic echo cancellation on any or all of the correlation reference channel, correlated second channel signal, and the correlated third channel signal.

At 1116, one or more processors associated with the playback device 700 apply the first acoustic echo cancellation output to the recorded stream of audio and apply the second acoustic echo cancellation output to the captured stream of audio, thereby increasing the signal-to noise ratio of the captured stream of audio from the first signal-to-noise ratio to a second signal-to-noise ratio, and the second signal-to-noise ratio is greater than the first signal-to-noise ratio.

In some embodiments, one or more processors associated with the playback device 700 may apply the first acoustic echo cancellation output to the recorded stream of audio, the second acoustic echo cancellation output to the captured stream of audio, and the third acoustic echo cancellation output to the captured stream of audio, thereby increasing the signal-to noise ratio of the captured stream of audio from the first signal-to-noise ratio to the second signal-to-noise ratio. In other embodiments, one or more processors associated with the playback device 700 may further apply the additional echo cancellation output to the recorded stream of audio to increase the signal-to noise ratio of the captured stream of audio from the first signal-to-noise ratio to the second signal-to-noise ratio.

The one or more processors associated with the playback device 700 may apply the first acoustic echo cancellation output, the second acoustic echo cancellation output, and optionally, the third (and additional) acoustic echo cancellation outputs to the recorded stream of audio in any manner. For example, two or more of the first acoustic echo cancellation output, the second acoustic echo cancellation output, and optionally, the third (and additional) acoustic echo cancellation outputs may be simultaneously applied to the recorded stream of audio. In other examples, the first acoustic echo cancellation output, the second acoustic echo cancellation output, and optionally, the third (and additional) acoustic echo cancellation outputs may be applied to the recorded stream of audio in parallel, in series, or in any combination thereof.

As previously explained, the one or more processors that performs acoustic echo cancellation may be the same processor that applies the acoustic echo cancellation output to the captured stream of audio. In some embodiments, the one or more processors may include the processor 770, the processor 702, the audio processing components 208 (illustrated in FIG. 2), and/or any other processor component associated with the playback device 700 or any other device. In some embodiments, one or more of the processors that performs acoustic echo cancellation may be different than one or more of the processors that applies the acoustic echo cancellation output to the captured stream of audio.

The acoustic echo cancellation may be performed, for example, according to one or more embodiments of the disclosed technology. In addition, the one or more processors associated with the playback device 700 may apply the first acoustic echo cancellation output, the second acoustic echo cancellation output, and optionally, the third (and additional) acoustic echo cancellation outputs to the captured stream of audio in any known manner to increase the signal-to noise ratio of the captured stream of audio from the first signal-to-noise ratio to the second signal-to-noise ratio. That is, with reference to the embodiment of FIG. 7, applying the first and second (and further) acoustic echo cancellation outputs to the captured stream of audio results in a second signal-to-noise ratio in the one or more communication links 774, and the second signal-to-noise ratio is greater than the first signal-to-noise ratio associated with the captured stream of audio prior to the application of the acoustic echo cancellation output (e.g., in the one or more communication links 772). Accordingly, the vocal command 758 of a user remains in the captured stream of audio for processing by the component 776 while the "noise" of the first channel audio output 756a and the second channel audio output 756b is reduced or removed.

As previously described, processing associated with acoustic echo cancellation may be performed in the Short-Time Fourier Transform ["STFT"] domain. That is, the correlation reference channel, the correlated second channel signal, the correlated third channel signal, and the captured stream of audio (and or any other signals associated with acoustic echo cancellation) may be transformed into a STFT domain. In addition, the adaptive cross-band filter may be used in the acoustic echo cancellation operation on any suitable set of signals. Further, the filter applied during application of the first and second (and, optionally, third) acoustic echo cancellation output to the captured stream of audio may be a compound filter comprising combined transfer functions for each channel to each microphone (which may be one of an array of microphones) and/or each speaker driver to each microphone.

Thus, by determining the cross-correlation between the correlation reference channel and the second channel stream of audio and a cross-correlation between the correlation reference channel and the third channel stream of audio, the computational complexity of the acoustic echo cancellation operation can be reduced relative to performing acoustic echo cancellation on each of the first channel stream of audio, the second channel stream of audio, and the third channel stream of audio. Thus, existing playback device CPUs can be used for the acoustic echo cancellation operation to achieve a satisfactory increase in the signal-to noise ratio of the captured stream of audio (e.g., an increase within the range of 10 db to 20 dB), thereby improving the performance of the voice control associated with the playback device 700 without incurring the cost of a more powerful CPU.

e. Example of Performing Acoustic Echo Cancellation Using Cross-Correlation

Figure 12:
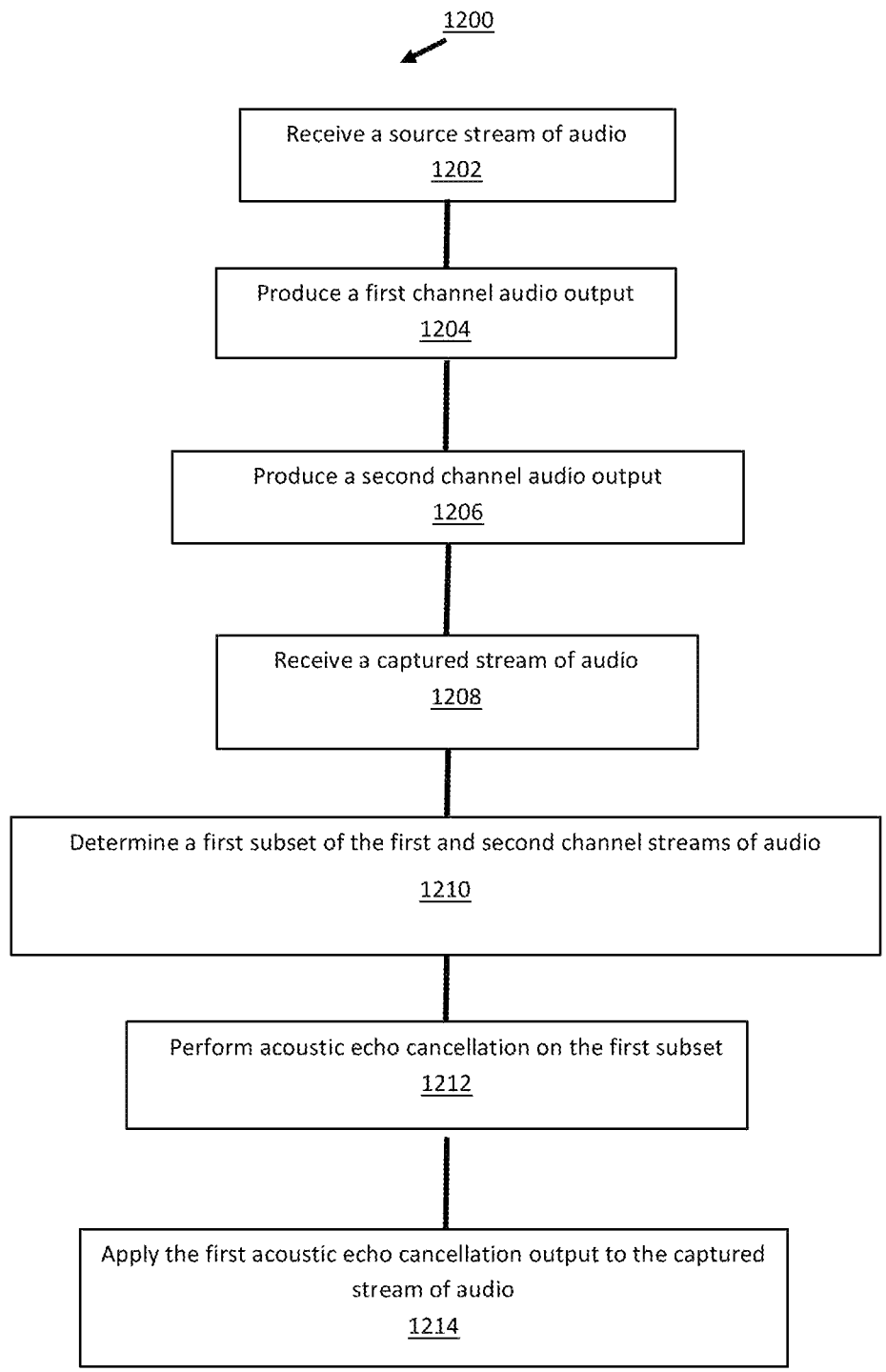
FIG. 12 is a flow diagram of a method of operating a playback device.

In other embodiments, a cross-correlation without a fixed reference, such as the correlation reference channel, may be incorporated into the acoustic echo cancellation process, and an exemplary method 1200 for operating the playback device 700 that incorporates a correlation reference channel is illustrated in FIG. 12.

At 1202, the playback device 700 receives a source stream of audio, and the playback device 700 has a first speaker driver 752a, at least a second speaker driver 752b, and at least one microphone 720, as previously described. As previously explained, the playback device 700 may include a third speaker driver and any number of additional speaker drivers. The source stream of audio may be received via the network interface 714 of the playback device 700, and the source stream of audio may include source audio content to be played back by the playback device 700, as previously explained. The source audio content may include a first channel stream of audio, a second channel stream of audio, and, optionally, a third channel stream of audio or additional channel streams of audio, as previously explained.

At 1204, the playback device 700 may play back, via the first speaker driver 752a, the first channel stream of audio, thereby producing a first channel audio output 756a, as previously described. At 1206, the playback device 700 may play back, via the second speaker driver 752b, the second channel stream of audio, thereby producing a second channel audio output 756b, as previously described. Also as previously described, the playback device 700 may play back, via the third speaker driver, the third channel stream of audio, thereby producing a third channel audio output. Further speaker drivers of the playback device 700 may playback further channel streams of audio, thereby producing further channel audio outputs.

At 1208, a microphone 720 receives or captures the stream of audio may be received or captured by the microphone 720. As previously described, the captured stream of audio may be transmitted via the communication link 772 to a processor 770. The captured stream of audio includes a first portion corresponding to the first channel audio output 756a, a second portion corresponding to the second channel audio output 756b, and a portion corresponding to a vocal command 758 issued by a user 760, and the captured stream of audio has a first signal-to-noise ratio. As previously explained, the captured stream of audio may also include a third portion corresponding to the third channel audio output and additional portions corresponding to additional channels of audio output.

At 1210, one or more processors associated with the playback device 700 may determine or select a first subset of the first channel stream of audio, the second channel stream of audio, and, optionally, the third channel stream of audio (and any additional channel streams of audio) based on one or more parameters. Moreover, one or more processors associated with the playback device 700 may determine or select a second subset of the first channel stream of audio, the second channel stream of audio, and, optionally, the third channel stream of audio (and any additional channel streams of audio) based on one or more parameters. Additional subsets may also be determined or selected.

In some embodiments, one or more processors associated with the playback device 700 selecting or determining the first subset of the first channel stream of audio, the second channel stream of audio, and, optionally, the third channel stream of audio based on one or more parameters may include or comprise cross-correlating the first channel stream of audio, the second channel stream of audio, and, optionally, the third channel stream of audio. Selecting or determining the first subset may be based on one or more parameters that result from the cross-correlation. For example, selecting or determining the first subset may include selecting or determining signal components from any or all of the first channel stream of audio, the second channel stream of audio, and the third channel stream of audio having an energy content above a first threshold energy content and/or a correlation above a first threshold correlation.

In some embodiments, selecting or determining the second subset of the first channel stream of audio, the second channel stream of audio, and, optionally, the third channel stream of audio based on one or more parameters may include or comprise cross-correlating the first channel stream of audio, the second channel stream of audio, and, optionally, the third channel stream of audio. Selecting or determining the second subset may be based on one or more parameters that result from the cross-correlation. For example, selecting or determining the second subset may include selecting or determining signal components from any or all of the first channel stream of audio, the second channel stream of audio, and the third channel stream of audio having an energy content above a second threshold energy content and/or a correlation above a second threshold correlation. The second threshold energy content may be different than (e.g., less than) the first threshold energy content and/or the second threshold correlation may be different than (e.g., less than) the first threshold correlation.

In some embodiments, the first subset may be signals common to the first channel stream of audio, the second channel stream of audio, and, optionally, the third channel stream of audio. A second subset may then be signals unique to the first channel stream of audio, a third subset may be signals unique to the second channel stream of audio, and a fourth subset may be signals unique to the third channel stream of audio.

The cross-correlations may be performed in any manner, and any or all of the cross-correlations may be performed by a processor disposed on or within a housing of the playback device 700, such as the processor 702, the processor 770, the audio processing components 208 (illustrated in FIG. 2), and/or any other processor component associated with the playback device 700. Alternatively, any or all of the cross-correlations may be performed by a processor disposed remote from the playback device 700.

At 1212, one or more processors associated with the playback device 700 performs acoustic echo cancellation on the first subset, and performing acoustic echo cancellation on the first subset produces a first acoustic echo cancellation output. Optionally, one or more processors associated with the playback device 700 may performs acoustic echo cancellation on the second subset, and performing acoustic echo cancellation on the second subset produces a second acoustic echo cancellation output. In addition, one or more processors associated with the playback device 700 may optionally perform acoustic echo cancellation on the third (and further) subsets to produce a third (and further) acoustic echo cancellation output. As previously explained, the processor 770 may perform acoustic echo cancellation on any or all of the first subset, the second subset, and the third subset.

At 1214, one or more processors associated with the playback device 700 applies the first acoustic echo cancellation output to the recorded stream of audio, thereby increasing the signal-to noise ratio of the captured stream of audio from the first signal-to-noise ratio to a second signal-to-noise ratio, and the second signal-to-noise ratio is greater than the first signal-to-noise ratio. In some embodiments, one or more processors associated with the playback device 700 may apply the first acoustic echo cancellation output to the recorded stream of audio, the second acoustic echo cancellation output to the captured stream of audio, and, optionally, the third (and further) acoustic echo cancellation output to the captured stream of audio to increase the signal-to noise ratio of the captured stream of audio from the first signal-to-noise ratio to the second signal-to-noise ratio.

In some embodiments, the one or more processors associated with the playback device 700 may apply the first acoustic echo cancellation output, the second acoustic echo cancellation output, and optionally, the third (and additional) acoustic echo cancellation outputs to the recorded stream of audio in any manner. For example, two or more of the first acoustic echo cancellation output, the second acoustic echo cancellation output, and optionally, the third (and additional) acoustic echo cancellation outputs may be simultaneously applied to the recorded stream of audio. In other examples, the first acoustic echo cancellation output, the second acoustic echo cancellation output, and optionally, the third (and additional) acoustic echo cancellation outputs may be applied to the recorded stream of audio in parallel, in series, or in any combination thereof.

As previously explained, the one or more processors that performs acoustic echo cancellation may be the same processor that applies the acoustic echo cancellation output to the captured stream of audio. In some embodiments, the one or more processors may include the processor 770, the processor 702, the audio processing components 208 (illustrated in FIG. 2), and/or any other processor component associated with the playback device 700 or any other device. In some embodiments, one or more of the processors that performs acoustic echo cancellation may be different than one or more of the processors that applies the acoustic echo cancellation output to the captured stream of audio.

The acoustic echo cancellation may be performed, for example, according to one or more embodiments of the disclosed technology. The one or more processors associated with the playback device 700 may apply the first acoustic echo cancellation output, and, optionally, the second acoustic echo cancellation output, and the third (and additional) acoustic echo cancellation outputs to the captured stream of audio in any known manner to increase the signal-to noise ratio of the captured stream of audio from the first signal-to-noise ratio to the second signal-to-noise ratio. That is, with reference to the embodiment of FIG. 7, applying the first and second (and further) acoustic echo cancellation outputs to the captured stream of audio results in a second signal-to-noise ratio in the one or more communication links 774, and the second signal-to-noise ratio is greater than the first signal-to-noise ratio associated with the captured stream of audio prior to the application of the acoustic echo cancellation output (e.g., in the one or more communication links 772). In some embodiments, the difference between the second signal-to-noise ratio and the first signal-to-noise ratio may be within the range of 10 db (or approximately 10 dB) to 20 dB (or approximately 20 dB). Thus, the vocal command 758 of a user remains in the captured stream of audio for processing by the component 776 while the "noise" of the first channel audio output 756a and the second channel audio output 756b is reduced or removed.

As previously described, processing associated with acoustic echo cancellation may be performed in the Short-Time Fourier Transform ["STFT"] domain. That is, the first, second, and third subset of the channel streams of audio and the captured stream of audio (and or any other signals associated with acoustic echo cancellation) may be transformed into a STFT domain. In addition, the adaptive cross-band filter may be used in the acoustic echo cancellation operation on any suitable set of signals. Further, the filter applied during application of the first and second (and, optionally, third) acoustic echo cancellation output to the captured stream of audio may be a compound filter comprising combined transfer functions for each channel to each microphone (which may be one of an array of microphones) and/or each speaker driver to each microphone.

Thus, by determining the cross-correlation between the first channel stream of audio, the second channel stream of audio and any additional streams of audio, the computational complexity of the acoustic echo cancellation operation can be reduced relative to performing acoustic echo cancellation on each of the first channel stream of audio, the second channel stream of audio, and the third channel stream of audio, as previously described.

Performing acoustic echo cancellation as described herein (and/or applying an acoustic echo cancellation output to the captured stream of audio) may be triggered in any suitable manner. For example, one or more processors associated with the playback device 700 may detect that a playback function is initiated by the playback device 700. In other examples, one or more processors associated with the playback device 700 may detect that an unmute command is received by the playback device after the playback function is initiated.

The examples provided herein involve methods, playback devices, and tangible, non-transitory computer-readable mediums. An embodiment of a method of operating a playback device may include receiving, via a network interface of the playback device, a source stream of audio comprising source audio content to be played back by the playback device. The playback device comprises a first speaker driver and at least a second speaker driver and further comprises at one or more microphone. The source audio content comprises a first channel stream of audio and a second channel stream of audio. The method may also include producing a first channel audio output by playing back, via the first speaker driver, the first channel stream of audio, and producing a second channel audio output by playing back, via the second speaker driver, the second channel stream of audio. The method may further include receiving, via the one or more microphones, a captured stream of audio comprising a first portion corresponding to the first channel audio output, and further comprising a second portion corresponding to the second channel audio output, wherein the captured stream of audio has a first signal-to-noise ratio. The method may additional include combining the first channel stream of audio and the second channel stream of audio into a compound audio signal and transforming the compound audio signal and the captured stream of audio into a Short-Time Fourier Transform domain. The method also includes performing acoustic echo cancellation on the compound audio signal, and performing acoustic echo cancellation on the compound audio signal produces an acoustic echo cancellation output. The method may additionally include applying the acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

In another aspect, a non-transitory computer-readable medium is provided. The non-transitory computer readable medium has stored thereon instructions executable by a computing device to cause the computing device to perform functions. The functions include receiving, via a network interface of the playback device, a source stream of audio comprising source audio content to be played back by the playback device, and the playback device comprises a first speaker driver and at least a second speaker driver and further comprises at least one microphone. The source audio content comprises a first channel stream of audio and a second channel stream of audio. The functions may also include producing a first channel audio output by playing back, via the first speaker driver, the first channel stream of audio, and producing a second channel audio output by playing back, via the second speaker driver, the second channel stream of audio. The functions may further include receiving, via the one or more microphones, a captured stream of audio comprising a first portion corresponding to the first channel audio output, and further comprising a second portion corresponding to the second channel audio output, wherein the captured stream of audio has a first signal-to-noise ratio. The functions may additional include combining the first channel stream of audio and the second channel stream of audio into a compound audio signal and transforming the compound audio signal and the captured stream of audio into a Short-Time Fourier Transform domain. The functions also include performing acoustic echo cancellation on the compound audio signal, and performing acoustic echo cancellation on the compound audio signal produces an acoustic echo cancellation output. The functions may additionally include applying the acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

In yet another aspect, a playback device is provided. The playback device includes a first speaker driver, at least a second speaker driver, one or more microphones, a processor, and a memory. The memory has stored thereon instructions executable by the processor to cause the payback device to perform functions. The functions include receiving, via a network interface of the playback device, a source stream of audio comprising source audio content to be played back by the playback device. The source audio content comprises a first channel stream of audio and a second channel stream of audio. The functions may also include producing a first channel audio output by playing back, via the first speaker driver, the first channel stream of audio, and producing a second channel audio output by playing back, via the second speaker driver, the second channel stream of audio. The functions may further include receiving, via the one or more microphones, a captured stream of audio comprising a first portion corresponding to the first channel audio output, and further comprising a second portion corresponding to the second channel audio output, wherein the captured stream of audio has a first signal-to-noise ratio. The functions may additionally include combining the first channel stream of audio and the second channel stream of audio into a compound audio signal. The functions also include performing acoustic echo cancellation on the compound audio signal, and performing acoustic echo cancellation on the compound audio signal produces an acoustic echo cancellation output. The functions may additionally include applying the acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

In a further aspect, the captured stream of audio comprises a third portion corresponding to a vocal command issued by a user, and wherein increasing the signal-to-noise ratio of the captured stream of audio from the first signal-to-noise ratio to the second signal-to-noise ratio results in the first portion and second portion being eliminated or minimized in the captured stream of audio.

In a further aspect, the functions also include detecting a trigger to perform acoustic echo cancellation on the compound audio signal, wherein detecting the trigger comprises detecting that (a) a playback function is initiated by the playback device or (b) an unmute command is received by the playback device after the playback function is initiated.

A further aspect of a method of operating a playback device may include receiving, via a network interface of the playback device, a source stream of audio comprising source audio content to be played back by the playback device. The playback device comprises a first speaker driver and at least a second speaker driver and further comprises one or more microphones. The source audio content comprises a first channel stream of audio and a second channel stream of audio. The method may also include producing a first channel audio output by playing back, via the first speaker driver, the first channel stream of audio, and producing a second channel audio output by playing back, via the second speaker driver, the second channel stream of audio. The method may further include receiving, via the one or more microphones, a captured stream of audio comprising a first portion corresponding to the first channel audio output and a second portion corresponding to the second channel audio output and further comprising a second portion corresponding to the second channel audio output, wherein the captured stream of audio has a first signal-to-noise ratio. The method may also include performing a singular value decomposition on the first channel stream of audio and the second channel stream of audio to result in a combined set of signal components. The method may additionally include selecting a subset of the combined set of signal components based on one or more parameters. The method may also include performing acoustic echo cancellation on the subset of the combined set of signal components, wherein performing acoustic echo cancellation on the subset of the combined set of signal produces a first acoustic echo cancellation output. The method may additionally include applying the first acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

In another aspect, a non-transitory computer-readable medium is provided. The non-transitory computer readable medium has stored thereon instructions executable by a computing device to cause the computing device to perform functions. The functions include receiving, via a network interface of the playback device, a source stream of audio comprising source audio content to be played back by the playback device. The playback device comprises a first speaker driver and at least a second speaker driver and further comprises one or more microphones. The source audio content comprises a first channel stream of audio and a second channel stream of audio. The functions may also include producing a first channel audio output by playing back, via the first speaker driver, the first channel stream of audio, and producing a second channel audio output by playing back, via the second speaker driver, the second channel stream of audio. The functions may further include receiving, via the one or more microphones, a captured stream of audio comprising a first portion corresponding to the first channel audio output and a second portion corresponding to the second channel audio output and further comprising a second portion corresponding to the second channel audio output, wherein the captured stream of audio has a first signal-to-noise ratio. The functions may also include performing a singular value decomposition on the first channel stream of audio and the second channel stream of audio to result in a combined set of signal components. The functions may additionally include selecting a subset of the combined set of signal components based on one or more parameters. The functions may also include performing acoustic echo cancellation on the subset of the combined set of signal components, wherein performing acoustic echo cancellation on the subset of the first set of signal produces a first acoustic echo cancellation output. The functions may additionally include applying the first acoustic echo cancellation output to the captured stream of audio, thereby increasing the signal-to noise ratio of the captured stream of audio from the first signal-to-noise ratio to a second signal-to-noise ratio, wherein the second signal-to-noise ratio is greater than the first signal-to-noise ratio.

In yet another aspect, a playback device is provided. The playback device includes a first speaker driver, at least a second speaker driver, one or more microphones, a processor and a memory. The memory has stored thereon instructions executable by the processor to cause the payback device to perform functions. The functions include receiving, via a network interface of the playback device, a source stream of audio comprising source audio content to be played back by the playback device. The source audio content comprises a first channel stream of audio and a second channel stream of audio. The functions may also include producing a first channel audio output by playing back, via the first speaker driver, the first channel stream of audio, and producing a second channel audio output by playing back, via the second speaker driver, the second channel stream of audio. The functions may further include receiving, via the one or more microphones, a captured stream of audio comprising a first portion corresponding to the first channel audio output and a second portion corresponding to the second channel audio output, wherein the captured stream of audio has a first signal-to-noise ratio. The functions may also include performing a singular value decomposition on the first channel stream of audio and the second channel stream of audio to result in a combined set of signal components. The functions may additionally include selecting a subset of the combined set of signal components based on one or more parameters. The functions may also include performing acoustic echo cancellation on the subset of the combined set of signal components, wherein performing acoustic echo cancellation on the subset of the combined set of signal produces a first acoustic echo cancellation output. The functions may additionally include applying the first acoustic echo cancellation output to the captured stream of audio, thereby increasing the signal-to-noise ratio of the captured stream of audio from the first signal-to-noise ratio to a second signal-to-noise ratio, wherein the second signal-to-noise ratio is greater than the first signal-to-noise ratio.

In a further aspect, the captured stream of audio comprises a third portion corresponding to a vocal command issued by a user, and wherein increasing the signal-to-noise ratio of the captured stream of audio from the first signal-to-noise ratio to the second signal-to-noise ratio results in the first portion and second portion being eliminated or minimized in the captured stream of audio.

In a still further aspect, the functions may additionally include detecting a trigger to perform acoustic echo cancellation on the on the subset of the first set of signal components or the subset of the second set of signal components, wherein detecting the trigger comprises detecting that (a) a playback function is initiated by the playback device or (b) an unmute command is received by the playback device after the playback function is initiated.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:
   a first set of one or more transducers;
   a second set of one of more transducers;
   at least one processor;
   a network interface;
   a non-transitory computer-readable medium; and
   program instructions stored on the non-transitory computer-readable medium that are executable by the at least one processor such that the playback device is configured to:
      produce, via the first set of one or more transducers, a first channel audio output of a first channel of given audio content;
      produce, via the second set of one or more transducers, a second channel audio output of a second channel of the given audio content;
      receive, by one or more microphones, captured audio content comprising (i) a first portion corresponding to the first channel audio output, (ii) a second portion corresponding to the second channel audio output, and (iii) a third portion corresponding to a voice command, wherein the captured audio content has a first signal-to-noise ratio;
      determine a set of signal components from at least one of the first channel or the second channel of the given audio content;
      select a subset of signal components from the set of signal components;
      perform acoustic echo cancellation on the subset of signal components and thereby determine an acoustic echo cancellation output; and
      apply the acoustic echo cancellation output to the captured audio content and thereby increase a signal-to-noise ratio of the captured audio content from the first signal-to-noise ratio to a second signal-to-noise ratio that is greater than the first signal-to-noise ratio.

2. The playback device of claim 1, further comprising program instructions stored on the non-transitory computer-readable medium that are executable by the at least one processor such that the playback device is configured to:
   before producing the first and second channel audio outputs, receive audio content for playback by the playback device, wherein the received audio content comprises the first channel of the given audio content and the second channel of the given audio content.

3. The playback device of claim 1, wherein the playback device comprises the one or more microphones.

4. The playback device of claim 1, wherein the program instructions that are executable by the at least one processor such that the playback device is configured to determine the set of signal components comprise program instructions that are executable by the at least one processor such that the playback device is configured to:
   determine the set of signal components based on a singular value decomposition of the first and second channels of the given audio content.

5. The playback device of claim 4, wherein each of the subset of signal components has at least one of (i) an energy content above a threshold energy content or (ii) a calculated variance above a threshold variance.

6. The playback device of claim 1, wherein the program instructions that are executable by the at least one processor such that the playback device is configured to determine the set of signal components comprise program instructions that are executable by the at least one processor such that the playback device is configured to:
  determine the set of signal components based on a cross-correlation of the first and second channels of the given audio content.

7. The playback device of claim 1, wherein the second signal-to-noise ratio is greater than the first signal-to-noise ratio by a range of 1 dB to 10 db.

8. The playback device of claim 1, further comprising:
  a third set of one or more transducers;
  a fourth set of one or more transducers; and
  program instructions stored on the non-transitory computer-readable medium that are executable by the at least one processor such that the playback device is configured to:
    produce a third channel audio output by playing back, via the third set of one or more transducers, a third channel of the given audio content; and
    produce a fourth channel audio output by playing back, via the fourth set of one or more transducers, a fourth channel of the given audio content.

9. The playback device of claim 1, wherein application of the acoustic echo cancellation output to the captured audio content results in the first portion and the second portion being eliminated or minimized.

10. The playback device of claim 1, wherein:
  the playback device further comprises program instructions stored on the non-transitory computer-readable medium that are executable by the at least one processor such that the playback device is configured to:
    combine at least the first channel of the given audio content and the second channel of the given audio content into a compound audio signal; and
  the program instructions that are executable by the at least one processor such that the playback device is configured to determine the set of signal components comprise program instructions that are executable by the at least one processor such that the playback device is configured to:
    determine the set of signal components from the compound audio signal.

11. The playback device of claim 1, further comprising program instructions stored on the non-transitory computer-readable medium that are executable by the at least one processor such that the playback device is configured to:
  before performing the acoustic echo cancellation on the subset of signal components, transform the captured audio content and at least one of the first channel of the given audio content or the second channel of the given audio content from a time domain into a frequency domain.

12. A non-transitory computer-readable medium, wherein the non-transitory computer-readable medium is provisioned with program instructions that, when executed by at least one processor, cause a playback device to:
  produce, via a first set of one or more transducers, a first channel audio output of a first channel of given audio content;
  produce, via a second set of one or more transducers, a second channel audio output of a second channel of the given audio content;
  receive, by one or more microphones, captured audio content comprising (i) a first portion corresponding to the first channel audio output, (ii) a second portion corresponding to the second channel audio output, and (iii) a third portion corresponding to a voice command, wherein the captured audio content has a first signal-to-noise ratio;
  determine a set of signal components from at least one of the first channel or the second channel of the given audio content;
  select a subset of signal components from the set of signal components;
  perform acoustic echo cancellation on the subset of signal components and thereby determine an acoustic echo cancellation output; and
  apply the acoustic echo cancellation output to the captured audio content and thereby increase a signal-to-noise ratio of the captured audio content from the first signal-to-noise ratio to a second signal-to-noise ratio that is greater than the first signal-to-noise ratio.

13. The non-transitory computer-readable medium of claim 12, wherein the non-transitory computer-readable medium is also provisioned with program instructions that, when executed by at least one processor, cause the playback device to:
  before producing the first and second channel audio outputs, receive audio content for playback by the playback device, wherein the received audio content comprises the first channel of the given audio content and the second channel of the given audio content.

14. The non-transitory computer-readable medium of claim 12, wherein the playback device comprises the one or more microphones.

15. The non-transitory computer-readable medium of claim 12, wherein the program instructions that, when executed by at least one processor, cause the playback device to determine the set of signal components comprise program instructions that, when executed by at least one processor, cause the playback device to:
  determine the set of signal components based on a singular value decomposition of the first and second channels of the given audio content.

16. The non-transitory computer-readable medium of claim 15, wherein each of the subset of signal components has at least one of (i) an energy content above a threshold energy content or (ii) a calculated variance above a threshold variance.

17. The non-transitory computer-readable medium of claim 12, wherein the program instructions that, when executed by at least one processor, cause the playback device to determine the set of signal components comprise program instructions that, when executed by at least one processor, cause the playback device to:
  determine the set of signal components based on a cross-correlation of the first and second channels of the given audio content.

18. A method carried out by a playback device, the method comprising:
  producing, via a first set of one or more transducers, a first channel audio output of a first channel of given audio content;
  producing, via a second set of one or more transducers, a second channel audio output of a second channel of the given audio content;
  receiving, by one or more microphones, captured audio content comprising (i) a first portion corresponding to the first channel audio output, (ii) a second portion corresponding to the second channel audio output, and (iii) a third portion corresponding to a voice command, wherein the captured audio content has a first signal-to-noise ratio;

determining a set of signal components from at least one of the first channel or the second channel of the given audio content;

selecting a subset of signal components from the set of signal components;

performing acoustic echo cancellation on the subset of signal components and thereby determining an acoustic echo cancellation output; and applying the acoustic echo cancellation output to the captured audio content and thereby increasing a signal-to-noise ratio of the captured audio content from the first signal-to-noise ratio to a second signal-to-noise ratio that is greater than the first signal-to-noise ratio.

19. The method of claim 18, further comprising:

before producing the first and second channel audio outputs, receiving audio content for playback by the playback device, wherein the received audio content comprises the first channel of the given audio content and the second channel of the given audio content.

20. The method of claim 18, wherein the playback device comprises the one or more microphones.

* * * * *